US006025051A

United States Patent [19]

Yanagisawa et al.

[11] Patent Number: 6,025,051

[45] **Date of Patent: *Feb. 15, 2000**

[54] PLATE-MAKING STRIP AND A PLATE MAKING-STRIP GROUP, AS WELL AS A PRINTER APPARATUS THEREFOR

[75] Inventors: Yoshiyuki Yanagisawa; Hiroshi Kuriyama; Eiji Tukahara; Kenichi Nakajima; Hideki Oikawa, all of Nagano; Kenji Watanabe, Tokyo; Takanobu Kameda, Tokyo; Tomoyuki Shimmura, Tokyo, all of Japan

[73] Assignees: Seiko Epson Corporation; King Jim Co., Ltd., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,036

[22] Filed: Dec. 17, 1996

[30] Foreign Application Priority Data

| | | | |
|---|---|---|---|
| Dec. 18, 1995 | [JP] | Japan | 7-329345 |
| Sep. 4, 1996 | [JP] | Japan | 8-253949 |

[51] Int. Cl.[7] B32B 3/24

[52] U.S. Cl. 428/138; 428/137; 428/42.2; 428/42.3; 428/195

[58] Field of Search 428/137, 42.2, 428/42.3, 138, 195

[56] References Cited

U.S. PATENT DOCUMENTS

| | | | |
|---|---|---|---|
| 3,585,928 | 6/1971 | Kaneko | 101/45 |
| 3,841,215 | 10/1974 | Hasegawa | 101/148 |
| 4,235,459 | 11/1980 | Callahan | 283/7 |
| 4,390,577 | 6/1983 | Brister et al. | 428/42 |
| 4,454,180 | 6/1984 | La Mers | 428/42 |
| 4,584,219 | 4/1986 | Baartmans | 428/42 |
| 4,642,256 | 2/1987 | Sato | 428/42 |
| 4,945,252 | 7/1990 | Lerner et al. | 250/548 |
| 4,968,547 | 11/1990 | McCarthy | 428/42 |
| 5,337,668 | 8/1994 | Matsuoka et al. | 101/481 |
| 5,487,340 | 1/1996 | Kanai | 101/486 |
| 5,644,136 | 7/1997 | Kameda et al. | 250/492.1 |
| 5,692,438 | 12/1997 | Kanai | 101/127.1 |
| 5,782,179 | 7/1998 | Kagawa et al. | 101/128.4 |
| 5,809,879 | 9/1998 | Yokoyama et al. | 101/128.4 |

FOREIGN PATENT DOCUMENTS

| | | |
|---|---|---|
| 62-78350 | 4/1994 | Japan . |

*Primary Examiner*—William P. Watkins, III
*Attorney, Agent, or Firm*—Loeb & Loeb, LLP

[57] ABSTRACT

A plate-making sheet in the form of a strip having two longer-sides and two shorter-sides includes a base sheet and an adhesive sheet laminated on the base sheet. The adhesive sheet has a label portion formed in the middle thereof for being printed with an image. The label portion is defined by a cutting line formed in the adhesive sheet. A plate-making sheet group includes a plurality of types of plate-making sheets having respective label portions different from each other, which are distinguished from each other in respect of color of at least one of the base sheet and the adhesive sheet. A printing apparatus for printing a stamp image on the label portion of the plate-making sheet comprises a printing mechanism for printing a stamp image on the label portion, a feed mechanism for feeding the plate-making sheet through the printing mechanism, and a sensor for detecting feeding of the plate-making sheet into the printing mechanism. The length of a portion of a feed path of an ink ribbon, which extends from a point where the ink ribbon leaves the printing mechanism to a central point of a stamp surface of a stamp-making object material, is substantially equal to a half of a length of each of the two longer-sides of the plate-making sheet.

9 Claims, 33 Drawing Sheets

FIG. 15B
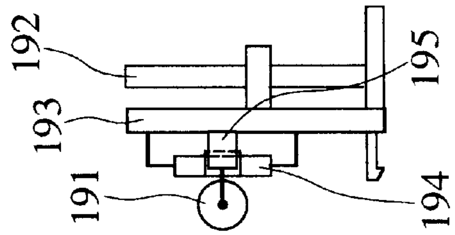
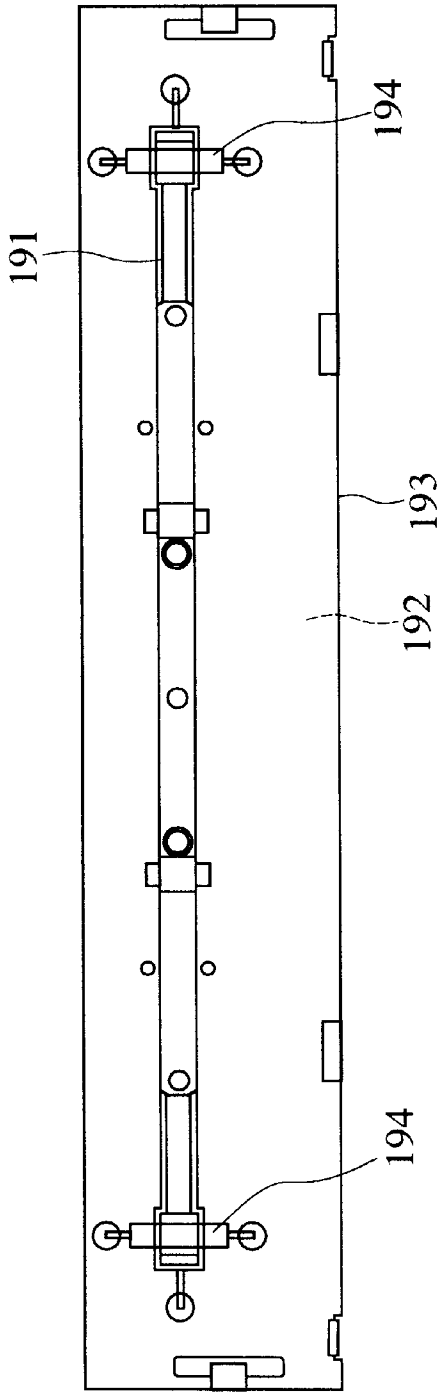
FIG. 15A

FIG. 31A SQUARE STAMP (SMALL)

FIG. 31B SQUARE STAMP (LARGE)

FIG. 31C PERSONAL NAME STAMP

FIG. 31D BUSINESS STAMP (SMALL)

FIG. 31E BUSINESS STAMP (LARGE)

FIG. 31F ADDRESS STAMP

FIG. 31G MAXIMUM SIZE STAMP

PLATE-MAKING STRIP AND A PLATE MAKING-STRIP GROUP, AS WELL AS A PRINTER APPARATUS THEREFOR

BACKGROUND OF THE INVENTION

1. Field of the Invention

This invention relates to a plate-making sheet for a stamp-making apparatus which makes a desired stamp by exposing a stamp body having a stamp surface made of ultraviolet-curing resin to ultraviolet rays via a mask of an ink ribbon printed with a stamp image, especially a plate-making sheet of this kind to be affixed to the back of the stamp, and a group of such plate-making sheets, as well as a printing apparatus which employs such plate-making sheets therefor.

2. Prior Art

Conventionally, a stamp-making apparatus of the above-mentioned kind has been proposed by Japanese Laid-Open Patent Publication (Kokai) No. 6-278350. The stamp-making apparatus includes a supply reel on which an ink ribbon used as a mask for exposure and a printing paper ribbon corresponding to the above-mentioned plate-making sheet are wound in a state laid one upon the other. The stamp-making apparatus has a printing block provided with a print head and a platen roller, and the ink ribbon and the printing paper ribbon are rolled out from the supply reel by the platen roller and fed to the print head, where printing is effected simultaneously on the ink ribbon and the printing paper ribbon. Thereafter, the ink ribbon is fed further to an exposure block, and the printing paper ribbon is discharged from the apparatus. From the printing paper ribbon, a stamp character label is peeled off for being affixed to the back of the stamp body exposed to ultraviolet rays.

In the conventional stamp-making apparatus, it is necessary to cut the printing paper ribbon discharged from the apparatus in accordance with the size of the back of the stamp body, so that a cutter is needed and a troublesome cutting work is required. Further, the printing paper ribbon and the ink ribbon wound in a state laid one upon the other around the supply reel makes the diameter of the supply reel very large, causing an undesirable increase in the size of a ribbon cartridge incorporating the supply reel. Conversely, if the diameter of the supply reel is set or restricted to a suitable size, it will cause the inconvenience that the printing paper ribbon and the ink ribbon wound therearound become short in length, and ribbon cartridges are required to be changed more frequently.

SUMMARY OF THE INVENTION

It is a first object of the invention to provide a plate-making sheet which does not need to be cut after printing.

It is a second object of the invention to provide a plate-making sheet group consisting of plate-making sheets which have different label portions but can be easily discriminated from each other.

It is a third object of the invention to provide a printing apparatus which is capable of accurately printing plate-making sheets.

To attain the first object, according to a first aspect of the invention, there is provided a plate-making sheet in the form of a strip having two longer-sides and two shorter-sides, the plate-making sheet including a base sheet and an adhesive sheet laminated on the base sheet, the adhesive sheet having a label portion provided in the middle thereof for being printed with an image.

The plate-making sheet according to the first aspect of the invention is characterized in that the label portion is defined by a cutting line formed in the adhesive sheet.

According to the plate-making sheet of the first aspect of the invention, only the label portion printed with the image can be easily peeled off the base sheet along the cutting line to thereby make a label for being affixed to an object material with ease without cutting.

Preferably, the base sheet and the adhesive sheet have colors different from each other.

According to this preferred embodiment, it is possible to easily discriminate the base sheet and the adhesive sheet from each other, and hence it is possible to prevent a wrong side of the plate-making sheet from being carelessly printed.

Preferably, the plate-making sheet is formed with at least one through hole for being detected by a sensor, each at a location spaced from a corresponding one of the two shorter-sides by a predetermined distance, and at the same time outside the label portion.

According to this preferred embodiment, by detecting one end of the plate-making sheet corresponding to the corresponding one of the two shorter-sides of the same and the at least one through hole of the same by the sensor or the like, a printing apparatus or the like which executes printing while feeding the plate-making sheet can detect the existence of the plate-making sheet itself by detecting the one end, and then easily identify the start position of printing by detecting the through hole. That is, even if a plurality of plate-making sheets having respective label portions different in length from each other are used, it is possible to accurately print an image on each label portion.

More preferably, the at least one through hole is formed at each location shifted from a center line parallel to the two longer sides of the plate-making sheet.

According to this preferred embodiment, it is also possible to detect the front or back of the plate-making sheet, i.e. discriminate the front and the back of the plate-making sheet from each other by detecting presence or absence of the through hole by the sensor.

Further preferably, the at least one through hole comprises a pair of through holes are formed at centrosymmetric locations with respect to a center of the plate-making sheet.

According to this preferred embodiment, when the plate-making sheet is fed for printing, it is possible to detect the front or back of the plate-making sheet i.e. discriminate the front and the back of the plate-making sheet from each other, regardless of an inserting direction (i.e. an end inserted) of the plate-making sheet, that is, without forming the plate-making sheet such that it has a forward end for insertion.

To attain the second object, according to a second aspect of the invention, there is provided a plate-making sheet group, comprising a plurality of types of plate-making sheets having respective label portions different from each other, the plurality of types of the plate-making sheets each having a base sheet and an adhesive sheet laminated on the base sheet and being in the form of a strip having two longer-sides and two shorter-sides, the adhesive sheet having a label portion of the respective label portions provided in the middle thereof for being printed with an image, the label portion being defined by a cutting line formed in the adhesive sheet, wherein the plurality of types of the plate-making sheet are distinguished from each other in respect of a color of at least one of the base sheet and the adhesive sheet.

According to the plate-making sheet group of the second aspect of the invention, it is possible to discriminate the types of plate-making sheets having respective different label portions, from each other, without forming the sheets such that they have a different shapes in plan view. That is, even if a plurality of types of plate-making sheets are formed to have completely the same shape, it is possible to easily recognize the difference of the respective label portions, by colors made different between the plate-making sheets.

Preferably, the base sheet and the adhesive sheet of each of the plurality of types of the plate-making sheets have colors different from each other.

To attain the third object, according to a third aspect of the invention, there is provided a printing apparatus for printing an image on a label portion of a plate-making sheet, the plate-making sheet having a base sheet and an adhesive sheet laminated on the base sheet and being in the form of a strip having two longer-sides and two shorter-sides.

The printing apparatus according to the third aspect of the invention is characterized in that the label portion is formed in the middle of the adhesive sheet such that the label portion is defined by a cutting line formed in the adhesive sheet, and that the printing apparatus comprises a printing mechanism for printing the image on the label portion, a feed mechanism for feeding the plate-making sheet through the printing mechanism, and a sensor for detecting feeding of the plate-making sheet into the printing mechanism.

According to the printing apparatus of the third aspect of the invention, it is possible to accurately print an image at a desired area of the plate-making sheet, that is, on the label portion, by controlling the feed mechanism based the output of the sensor.

Preferably, the label portion is a stamp character label to be affixed to a back of a stamp, and the printing mechanism is constructed such that the printing mechanism simultaneously effects printing of the label portion and printing of a mask for use in making the stamp.

According to this preferred embodiment, it is possible to print a stamp character to be formed in the stamp and a stamp character to be formed on the stamp character label for being affixed to the back of the stamp, such that they have completely the same size and the same typeface.

More preferably, the plate-making sheet is formed with at least one through hole for being detected by the sensor, each at a location spaced from a corresponding one of the two shorter-sides by a predetermined distance, and at the same time outside the label portion, the sensor being an optical sensor which detects a change in a light-receiving state thereof caused by at least one of the at least one through hole and one end of the plate-making sheet corresponding to the corresponding one of the two shorter-sides, to thereby detect the feeding of the plate-making sheet.

Further preferably, the at least one through hole is formed at a location each shifted from a center line parallel to the two longer sides of the plate-making sheet, and wherein the printing apparatus further includes means for determining that the plate-making sheet is properly inserted when light passing through the at least one through hole is detected by the optical sensor.

Still more preferably, the printing apparatus includes means for stopping the feeding of the plate-making sheet by the feed mechanism, when the at least one through hole is not detected after the plate-making sheet is fed by a predetermined amount after detection of the one end of the plate-making sheet corresponding to the corresponding one of the two shorter-sides.

According to this preferred embodiment, it is possible to prevent the printing from being effected on the plate-making sheet inserted improperly.

Preferably, the printing apparatus includes means for controlling the printing mechanism in a manner such that the printing mechanism starts printing, when the feed mechanism has fed the plate-making sheet to a print-start position set in accordance with a length of the image to be printed, after detection of the feeding of the plate-making sheet into the printing mechanism.

According to this preferred embodiment, it is possible to set the plate-making sheet with accuracy in a proper position according to the image to be printed, and thereafter start printing.

To attain the third object, according to a fourth aspect of the invention, there is provided a printing apparatus, comprising a printing mechanism for executing a printing action on a plate-making sheet and an ink ribbon in a state of the plate-making sheet and the ink ribbon being positioned one upon another, the plate-making sheet having a base sheet and an adhesive sheet laminated on the base sheet and being in the form of a strip having two longer-sides and two shorter-sides, whereby a portion of ink of the ink ribbon is transferred to the plate-making sheet to form a stamp image on a label portion of the plate-making sheet and at the same time form a negative image on the ink ribbon, an exposure mechanism for exposing a stamp surface of a stamp-making object material to light by using the ink ribbon formed with the negative image as a mask, to thereby form a stamp image on the stamp surface, and a feed mechanism for feeding the plate-making sheet and the ink ribbon to the printing mechanism to cause the plate-making sheet and the ink ribbon to be simultaneously positioned before the printing mechanism, and after completion of the printing action of the printing mechanism, further feeding the ink ribbon to the exposure mechanism to cause the ink ribbon to face the exposure mechanism and at the same time sending the plate-making sheet out of the printing apparatus, wherein length of a portion of a feed path of the ink ribbon, the portion extending from a point where the ink ribbon leaves the printing mechanism to a central point of the stamp surface of the stamp-making object material, is substantially equal to a half of a length of each of the two longer-sides of the plate-making sheet.

According to the printing apparatus of the fourth aspect of the invention, after completion of the printing, when the feed mechanism feeds the ink ribbon to the exposure mechanism to cause the ink ribbon to face the exposure mechanism and at the same time send the plate-making sheet out of the apparatus, the center of the negative image formed on the ink ribbon reaches a central point of the stamp surface of the stamp-making object material at the instant of the plate-making sheet leaving the printing mechanism to be completely discharged from the apparatus. That is, simultaneously with discharge of the plate-making sheet from the apparatus, the exposure mechanism is made ready for the exposure. This means that at a time point a user recognizes the completion of the printing action, the exposure mechanism is ready for operation of the exposure. Therefore, it is possible to prevent the exposure mechanism from being operated before it is ready for operation, as well as minimize a time period over which the ink ribbon is fed from the printing mechanism to the exposure mechanism. Further, since the length of the portion of the feed path of the ink ribbon is set with reference to the central point of the stamp surface of a stamp-making object material, even if the length of a stamp image depends on the stamp-making object material, it is possible to form the stamp image in a proper area on the stamp surface of the stamp-making object material.

Preferably, the length of the portion of the feed path of the ink ribbon is set to a length slightly longer than the half of the length of each of the two longer-sides of the plate-making sheet.

According to this preferred embodiment, even if the manufacturing process causes a variation in the length of the plate-making sheet in the feeding direction thereof, i.e. the length of the two longer-sides thereof, it is possible to have the plate-making sheet completely discharged from the apparatus when the center of the negative image on the ink ribbon reaches the central point of the stamp surface of the stamp-making object material. That is, it is possible to avoid an undesired state in which the discharge of the plate-making sheet is not completed when the feeding of the ink ribbon is stopped for exposure.

To attain the first object, according to a fifth aspect of the invention, there is provided a plate-making sheet in the form of a strip having two longer-sides and two shorter-sides, the plate-making sheet including a base sheet and an adhesive sheet laminated on the base sheet, the adhesive sheet having a label portion provided in the middle thereof for being printed with an image.

The plate-making sheet according to the fifth aspect of the invention is characterized in that the plate-making sheet is formed with at least one through hole for being detected by a sensor, each at a location which is spaced from a corresponding one of the two shorter-sides by a predetermined distance, at the same time outside the label portion, and shifted from a center line parallel to the two longer sides of the plate-making sheet.

According to the plate-making sheet of the fifth aspect of the invention, by detecting one end of the plate-making sheet corresponding to the corresponding one of the two shorter-sides thereof and the at least one through hole of the same by the sensor or the like, a printing apparatus or the like which executes printing while feeding the plate-making sheet can detect the existence of the plate-making sheet itself by detecting the one end, and then easily identify the start position of printing by detecting the through hole. That is, even if a plurality of plate-making sheets having respective label portions different in length from each other are used, it is possible to accurately print an image on each label portion. Further, it is also possible to detect the front or back of the plate-making sheet, i.e. discriminate the front and the back of the plate-making sheet from each other by detecting presence or absence of the through hole by the sensor.

To attain the third object, according to a sixth aspect of the invention, there is provided a printing apparatus for printing an image on a label portion of a plate-making sheet, the plate-making sheet having a base sheet and an adhesive sheet laminated on the base sheet and being in the form of a strip having two longer-sides and two shorter-sides.

The printing apparatus according to the sixth aspect of the invention is characterized in that the plate-making sheet is formed with at least one through hole for being detected by a sensor, each at a location which is spaced from a corresponding one of the two shorter-sides by a predetermined distance, at the same time outside the label portion, and shifted from a center line parallel to the two longer sides of the plate-making sheet, and the printing apparatus comprises a printing mechanism for printing the image on the label portion, a feed mechanism for feeding the plate-making sheet through the printing device, and a sensor for detecting feeding of the plate-making sheet into the printing mechanism by detecting at least the at least one through hole.

According to the printing apparatus of the sixth aspect of the invention, it is possible to determine whether or not a proper plate-making sheet is inserted therein by detecting presence or absence of the through hole by the sensor, and at the same time detect the front or back of the plate-making sheet, i.e. discriminate the front and the back of the proper plate-making sheet from each other. Further, it is possible to accurately print an image at a desired area of the plate-making sheet, that is, on the label portion, by controlling the feed mechanism based the output of the sensor.

The above and other objects, features, and advantages of the invention will become more apparent from the following detailed description taken in conjunction with the accompanying drawings.

BRIEF DESCRIPTION OF THE DRAWINGS

FIG. 15A is a front elevation showing an ultraviolet ray source of the exposure system and component parts associated therewith;

FIG. 15B is a side elevation showing the ultraviolet rays source of the exposure system and component parts associated therewith;

FIGS. 25A and 25B are diagrams which are useful in explaining construction of a stamp body of a square stamp, in which:

FIG. 25A shows the stamp body of the square stamp in a state mounted in the pocket; and FIG. 25B shows the bottom of the stamp body of the square stamp;

FIGS. 25C and 25D are diagrams which are useful in explaining construction of a stamp body of a business stamp, in which:

FIG. 25C shows the stamp body of the business stamp in a state mounted in the pocket; and FIG. 25D shows the bottom of the stamp body of the business stamp;

DETAILED DESCRIPTION

The invention will now be described in detail with reference to the drawings showing embodiments thereof.

Figure 1A:
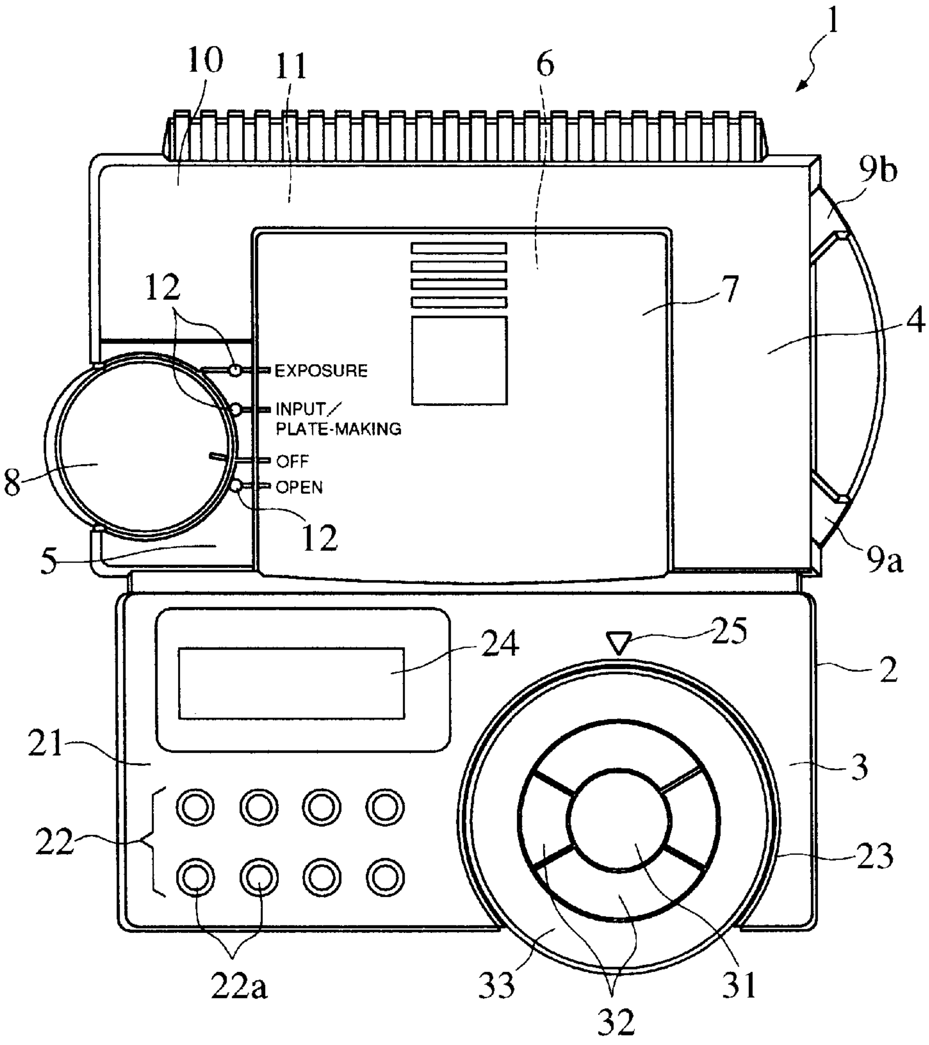
FIG. 1A is a plan view of an appearance of a stamp-making apparatus incorporating a printing device for printing a plate-making sheet, according to one embodiment of the invention.
Figure 1B:
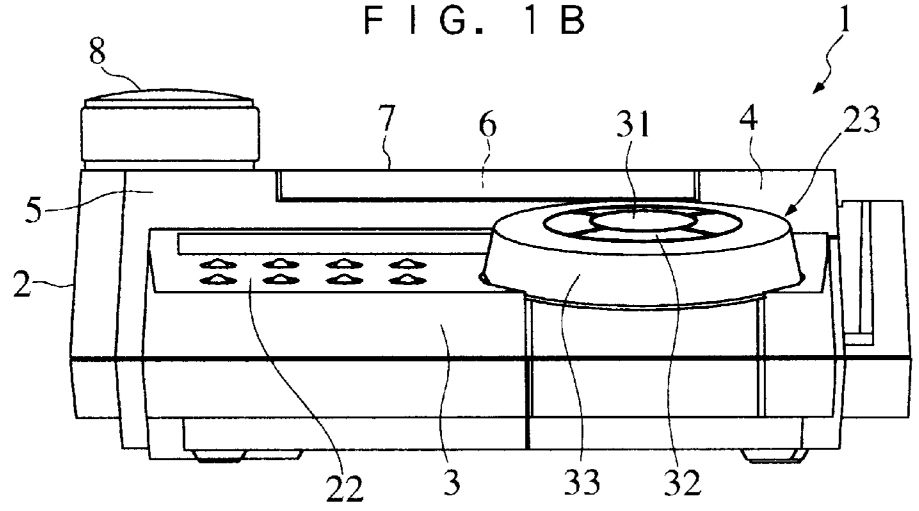
FIG. 1B is a front view of an appearance of the stamp-making apparatus.

Referring first to FIGS. 1A and 1B, there is shown a stamp-making apparatus 1 incorporating a printing apparatus using a plate-making sheet and a plate-making sheet group, according to an embodiment of the invention. The stamp-making apparatus makes a desired stamp by exposing a stamp body having a stamp surface made of ultraviolet-curing resin to ultraviolet rays via a mask of an ink ribbon printed with a stamp image including images of characters and pictures. The stamp-making apparatus prints the stamp image simultaneously on the ink ribbon and the plate-making sheet. The plate-making sheet printed with the stamp image is used for checking the stamp image printed on the ink ribbon, and a label (stamp character label) on the plate-making sheet, on which the stamp image is printed, is peeled off and affixed to the back of the completed stamp. FIG. 1A is a plan view of the apparatus, while FIG. 1B is a front elevation of the same.

As shown in these figures, the stamp-making apparatus 1 includes a casing 2 having upper and lower divisional portions, an electronic block 3 arranged in a front part of the casing 2, and a mechanical block 4 arranged in a rear part of the same. The mechanical block 4 is comprised of a mechanical block body 5, a pocket 6 formed in a central area of the mechanical block for receiving therein a stamp body A as a stamping-making object material from which a stamp is made, and a lid 7 for opening and closing the pocket 6, which is formed with a window. In a left side portion of the mechanical block 4 as viewed in the figures, a function switch (operating knob) 8 is provided for switching the operation of the stamp-making apparatus 1 e.g. to printing or exposure, as well as for permitting the lid 7 to be opened. In a right side portion of the mechanical block 4, an inserting slot 9*a* for feeding a plate-making sheet, or strip, B from which a stamp character label, referred to hereinafter, is made, and a take-out slot 9*b* for delivering the plate-making sheet B. Further, the mechanical block 4 has a maintenance cover 10 removably mounted on part thereof outside the pocket 6, and an ink ribbon cartridge 11 carrying an ink ribbon C is mounted under the maintenance cover 10.

The electronic block 3 has an operating block 21 arranged in a top thereof and contains an information processing system therein. The operating block 21 includes a push button group 22 and an operating dial 23 which form an input block of the information processing system, and an indicator 24 which forms an output block of the same. The operating dial 23 has a trial structure of an execution key 31 having a circular shape and arranged in the center thereof, a cursor/conversion key 32 having four divisional blocks arranged along the periphery of the execution key 31 to form a annular shape, and a character entry key 33 having an annular shape and arranged along the outer periphery of the cursor/conversion key 32. On the surface of the character entry key 33, hirakana characters representative of the Japanese syllabary, not shown, are printed. The entry of stamp characters is carried out by first setting each of desired hirakana characters to a triangle mark 25 by turning the character entry key 33, and pushing the execution key 31 whenever each of the desired hirakana characters is set to the triangle mark 25, followed by converting desired ones of the entered hirakana characters to kanji characters by operating the cursor/conversion key 32. When desired stamp characters are formed on the display 24, a predetermined button 22*a* of the push button group 22 is pushed to settle the inputting of the desired characters. The operating dial 23 is constructed such that the character entry key 33 alone can rotate in both directions.

Now, a sequence of operations for making a stamp will be briefly described with reference to FIGS. 1A and 1B, and 2. First, the function switch 8 is operated to open the lid 7, and a stamp body A is set in the pocket 6. As the stamp body A is set, a type or kind thereof is detected by a detecting device 66, described in detail hereinafter, and based on results of the detection, the information processing system controls the input block and the output block thereof. Then, the function switch 8 is operated to shift the function of the apparatus to plate-making, and the push button group 22 and the operating dial 23 are operated to enter stamp characters. When the entry of stamp characters is completed, the plate-making sheet B on which a stamp character label is provided is set by inserting the same into the inserting slot 9*a*.

Then, a predetermined button 22*a* of the push button group 22 is operated to cause the apparatus to execute the plate-making operation, i.e. printing of the stamp characters. The printing is effected simultaneously on the ink ribbon C and the plate-making sheet B. When the printing is completed, the ink ribbon C is fed or advanced to set a portion thereof printed with the stamp characters for exposure to ultraviolet rays, and at the same time plate-making sheet B is discharged from the take-out slot 9*b*. When it is confirmed by the plate-making sheet B that there is no error in the printed stamp characters, the function switch 8 is operated to shift the function of the apparatus to exposure, thereby causing the same to perform exposure of the stamp body to ultraviolet rays. The apparatus may be configured such that after operating the function switch 8, a predetermined button 22*a* is operated to cause the apparatus to start the exposure.

When the exposure is completed, the function switch 8 is operated to open the lid 7, and then the stamp body A is removed from the pocket 6 for washing. The washing completes the stamp. Before or after completion of the stamp, the stamp character label is peeled off the plate-making sheet B to attach the same to the back of the stamp.

Next, the component devices of the stamp-making apparatus 1 will be described, one by one.

The function switch 8 arranged in the mechanical block 4 can be turned clockwise from an "OFF" position in which the apparatus is set on stand-by to an "OPEN" position, or anticlockwise from the "OFF" position to an "INPUT/PLATE-MAKING" position, and further to an "EXPOSURE" position (see FIG. 1A). In the "OPEN" position, the lid 7 provided on the pocket 6 is popped up to open, and in the "INPUT/PLATE-MAKING" position and the "EXPOSURE" position, mechanical operations of a printing block and a stamp body A, referred to hereinafter, are carried out. The function switch 8 also serves as a switch for switching between electrical modes of the apparatus. By an electrical mode-switching operation of the function switch 8, a corresponding one of lamps 12 (no lamp for the "OFF" position) provided adjacent to the function switch 8 is lighted to indicate the selected position.

The ribbon cartridge 11 is constructed such that it is removable from the mechanical block body 5, and it is replaceable together with a casing thereof when the ink ribbon C is used up. As shown in FIG. 2, the ribbon cartridge 11 has a take-up reel 13 arranged at one end thereof and a supply reel 14 arranged at the other end thereof. The ink ribbon C is rolled out from the supply reel 14, fed along a feed path in the form of a rotation of an inverted-L shape as viewed in FIG. 2, and taken up by the take-up reel 13. The feed path in the form of a rotation of an inverted-L shape has a shorter side portion which the printing block faces and a longer side portion which the exposure block faces. The printing block faces the ink ribbon C and the plate-making sheet B simultaneously, and the exposure block faces the ink ribbon C printed with the image of the stamp characters.

The ink ribbon C is comprised of a transparent ribbon tape and ink coated thereon. In the present embodiment, it has a thickness of 6 $\mu$m. When the printing block of the apparatus carries out printing on the ink ribbon C, a portion of ink coated on the ink ribbon, which defines a character, is transferred to the plate-making sheet B, whereby the ribbon tape of the ink ribbon C is formed with a negative image by a transparent portion from which the portion of ink defining the character has been transferred, while the plate-making sheet B is formed with a positive image by the transferred portion of ink defining the character. The ink ribbon C is sent forward to the exposure block, where the negative image-formed portion thereof is used as a mask in carrying out the exposure, while the plate-making sheet B is delivered from the apparatus for a user to confirm the stamp characters and affix part (label) of the plate-making sheet B to the stamp thus made.

Figure 33:
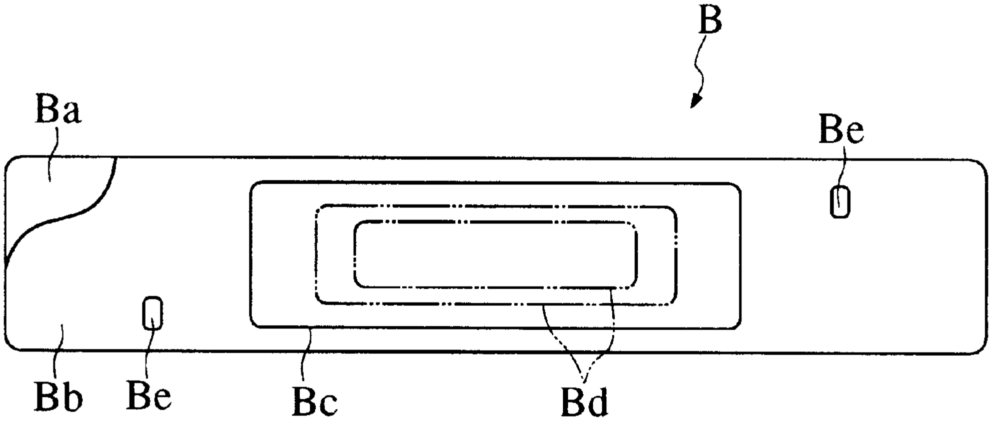
FIG. 33 is a diagram showing a structure of a plate-making sheet.

As shown in FIG. 33, the plate-making sheet B is in the form of a strip having a stamp character label Bd formed in the middle thereof, which can be peeled off. The plate-making sheet B will be described in further detail hereinafter.

Figure 32:
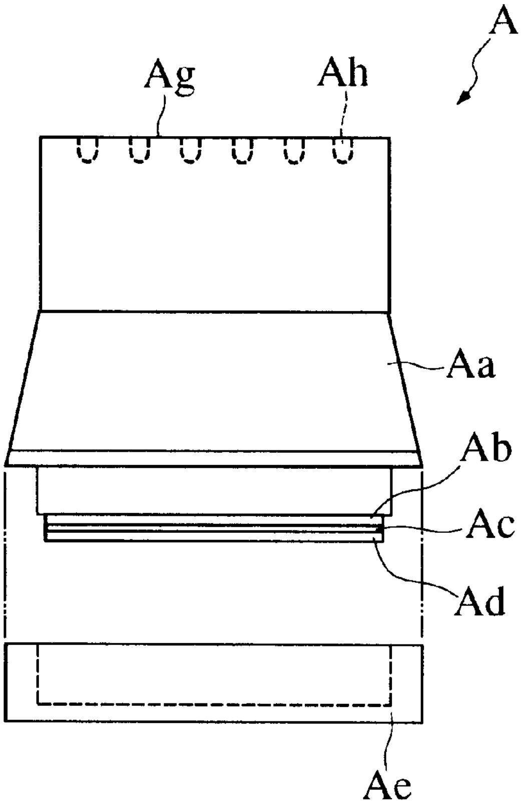
FIG. 32 is a diagram showing a structure of a stamp body.

On the other hand, as shown in FIG. 32, the stamp body A is comprised of a stock Aa (formed of a resin in the present embodiment), a thin sponge Ab (foamed urethane) affixed to a front end of the stock Aa, a non-ultraviolet-curing resin base Ac affixed to the sponge Ab, and an ultraviolet-curing resin affixed to the resin base Ac for forming a stamp surface Ad. The ultraviolet-curing resin portion (stamp surface Ad) of the stamp body A is exposed to ultraviolet rays with the ink ribbon C as a mask, whereby portions of the stamp surface Ad corresponding to the stamp characters are cured. In this state, the stamp body A is taken out of the pocket 6, and washed with water to remove uncured portions of the stamp surface, which are soluble in water, from the stamp surface Ad. Thus the stamp is completed. Symbol Ae in the figure designates a cap made of resin. In stead of the ultraviolet-curing resin, ultraviolet-softening resin may be used. In such a case, the reversed relationship of the ink ribbon C and the plate-making sheet B in respect of positiveness and negativeness makes it possible to make the same stamp as made in the present embodiment.

Figure 2:
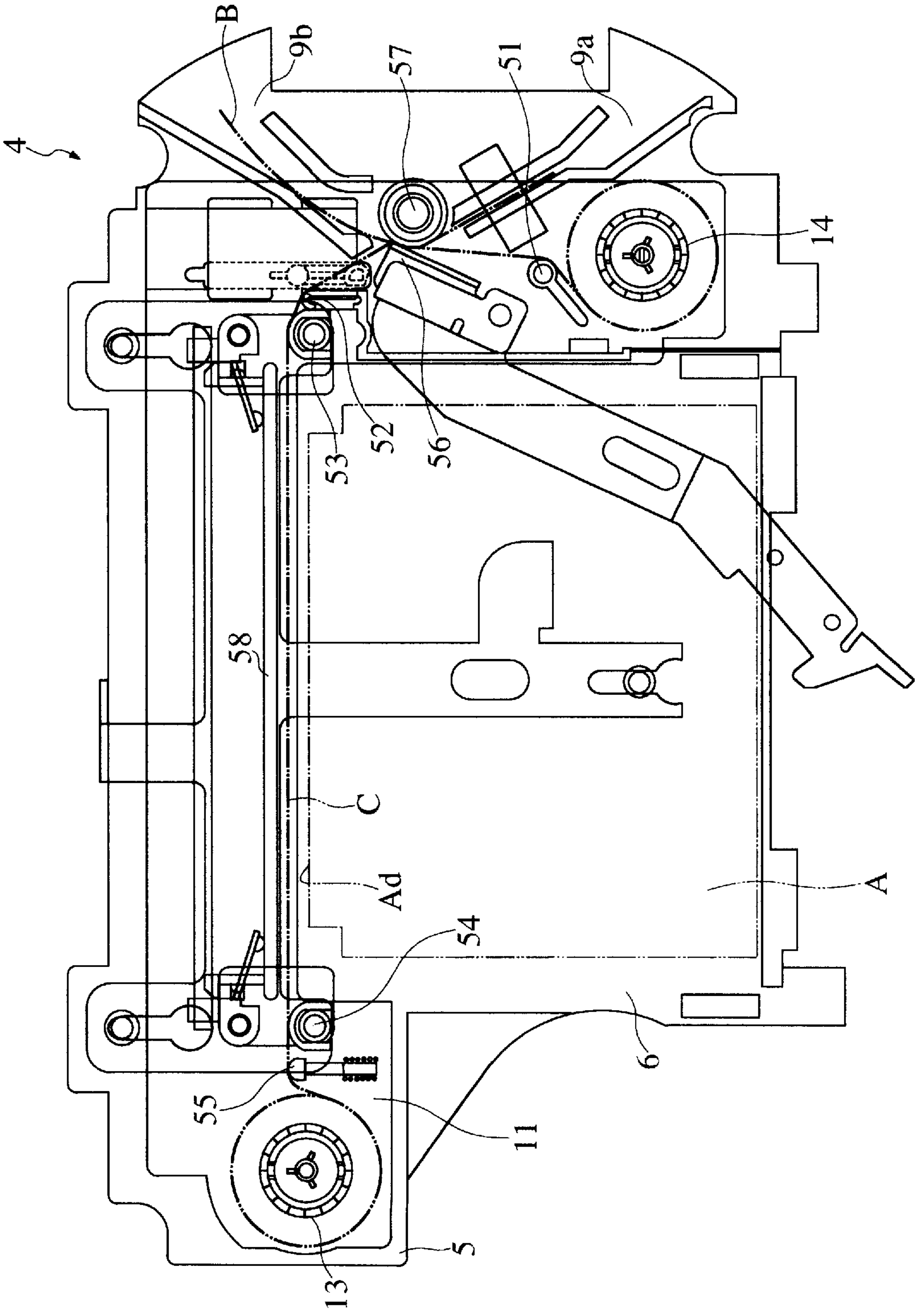
FIG. 2 is a plan view showing an internal construction of a mechanical block of the stamp-making apparatus.

As shown in FIG. 2, in the stamp-making apparatus 1, the ink ribbon C wound around the supply reel 14 is rolled out therefrom, and fed via a first path-setting pin 51 to the printing block, and further via a second path-setting pin 52 and a first guide pin 53 to the exposure block. From the exposure block, the ink ribbon C is advanced to the take-up reel 13 via a second guide pin 54 and a tension pin 55 to be taken up by the take-up reel 13. In the printing block, a print head 56 and a platen roller 57 arranged in a manner sandwiching the ink ribbon C operates to push the ink ribbon C forward while printing a character on the ink ribbon C. In the exposure block, a presser plate 58 holds the ink ribbon C between the stamp body A and itself to carry out the exposure of the stamp body to ultraviolet rays.

Figure 3:
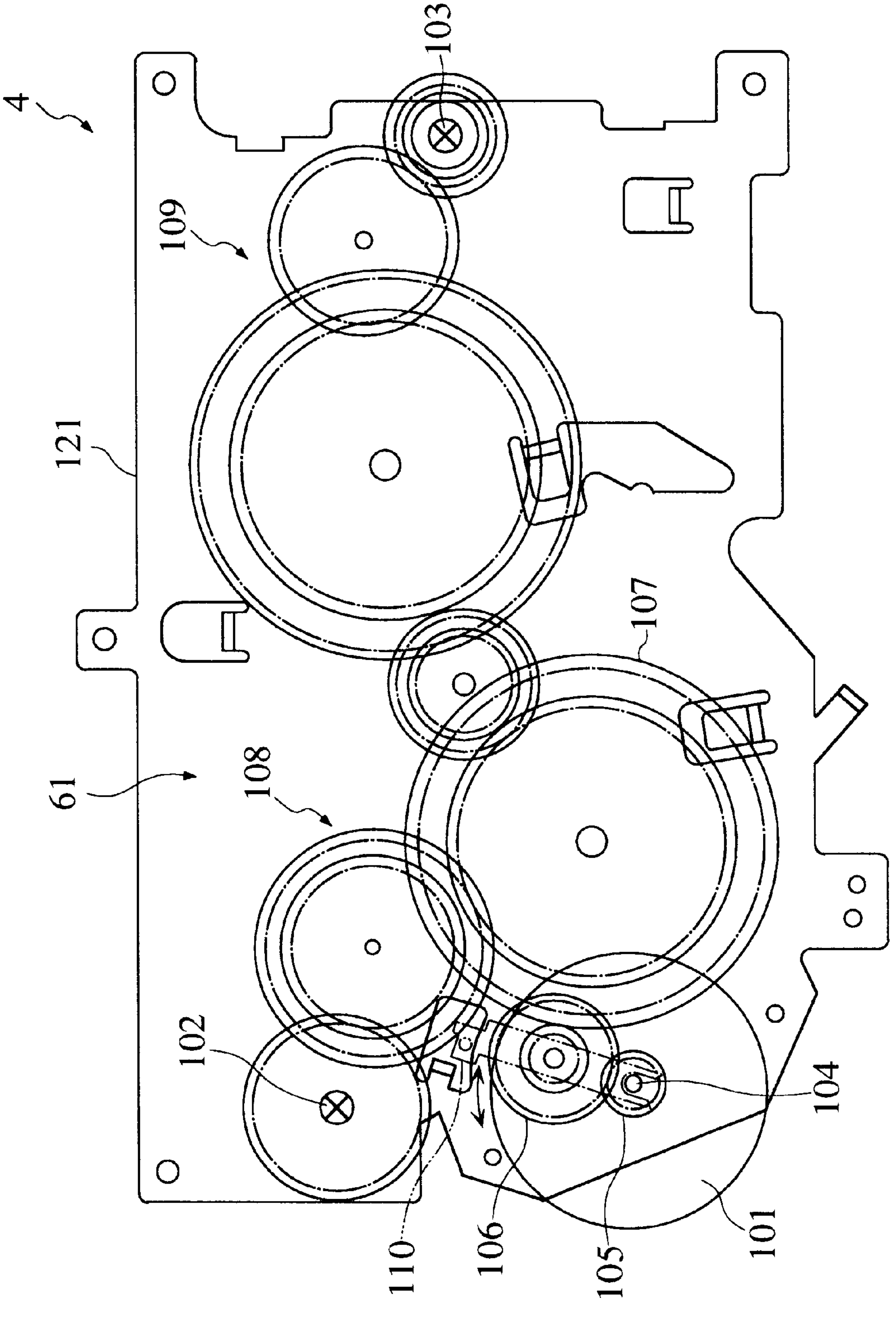
FIG. 3 is a schematic plan view showing a ribbon feeder provided in the mechanical block.
Figure 4:
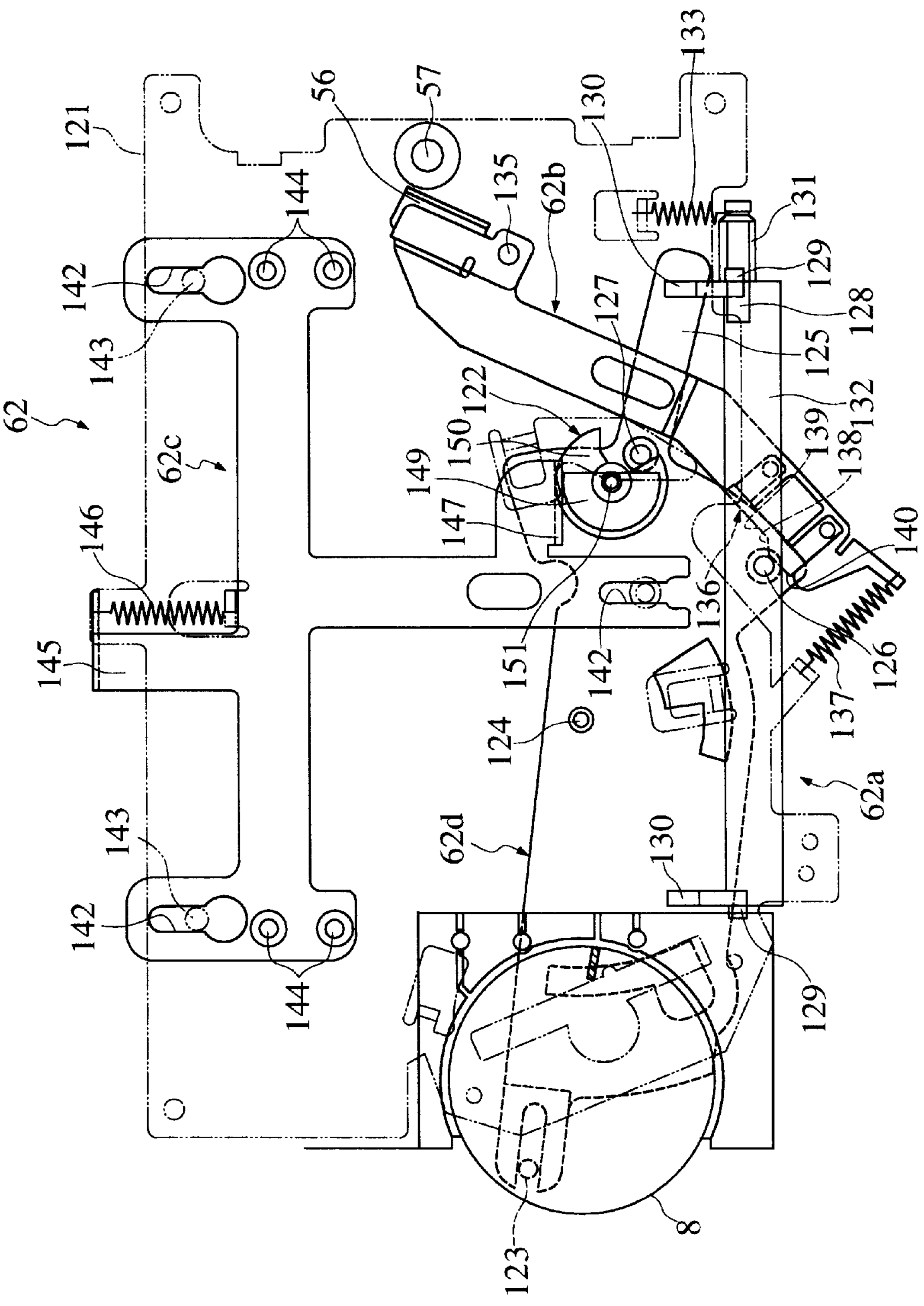
FIG. 4 is a plan view showing a function link mechanism provided in the mechanical block, in its "OFF" position.
Figure 5:
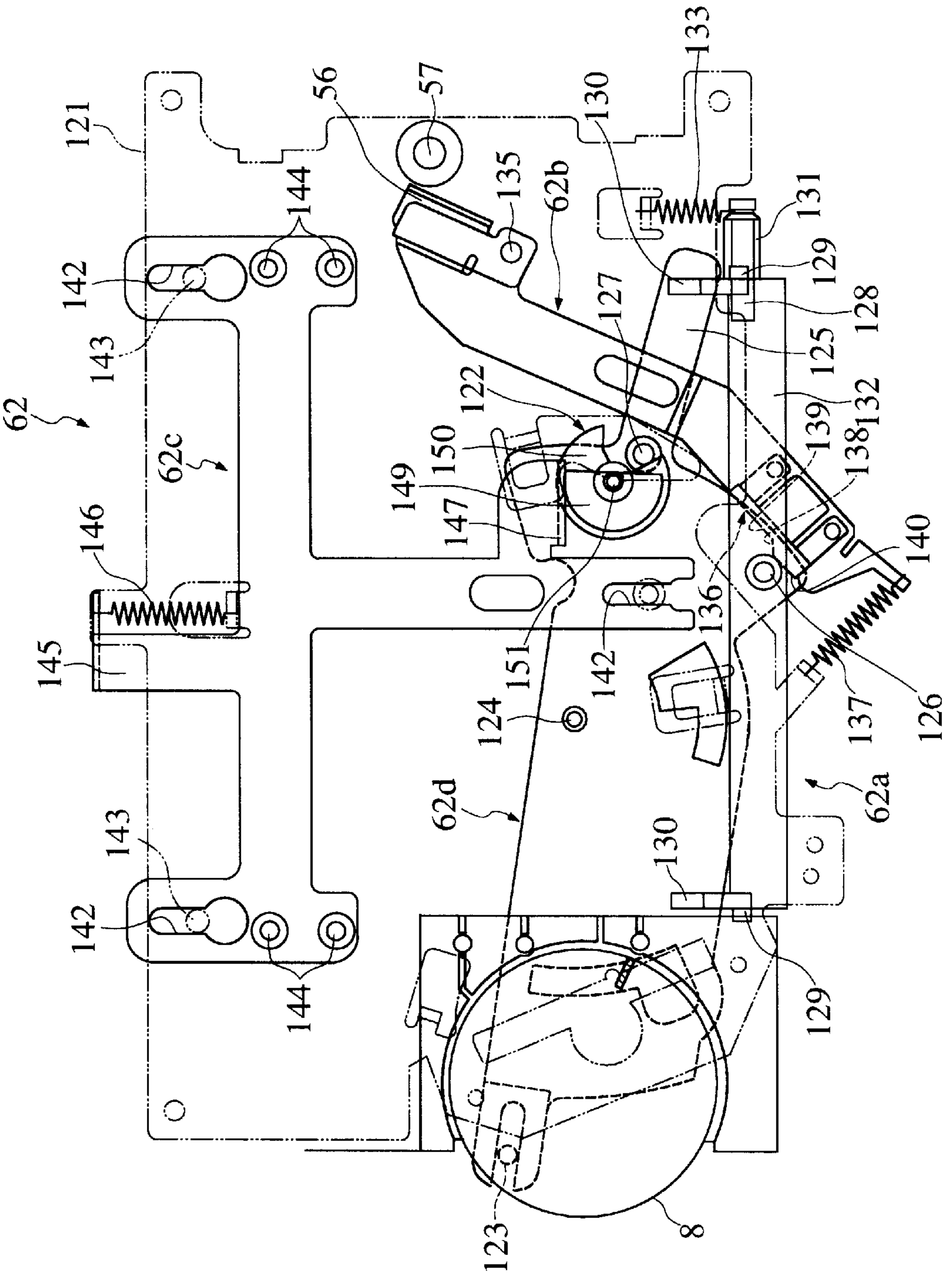
FIG. 5 is a plan view showing the function link mechanism in its "OPEN" position.

As shown in FIG. 3, the mechanical block 4 incorporates a ribbon feeder 61 which rotates the take-up reel 13 and the platen roller 57 to feed the ink ribbon C. Further, as shown in FIG. 4, the mechanical block 4 incorporates a function link mechanism 62 comprised of a lid-opening link 62*a* for locking/unlocking the lid 7, a head-moving link 62*b* for moving the print head 56 of the printing block to and from the platen roller 57, a ribbon-holding link 62*c* for moving the presser plate 58 of the exposure block forward or backward, and a main link 62*d* for actuating the lid-opening link 62*a*, the head-moving link 62*b* and the ribbon-holding link 62*c*.

First, the ribbon feeder 61 will be described in detail with reference to FIG. 3. The ribbon feeder 61 has a drive motor 101 arranged below the bottom of the function switch 8 as a driving force source, and a reel shaft 102 fitted on the take-up reel 13 and a roller shaft 103 having the platen roller 57 fitted thereon are driven for rotation by the drive motor 101. The drive motor 101 has an output shaft 104 on which an output gear 105 is rigidly fitted. The output gear 105 is mated with a driving force-transmitting gear 106, which in turn is mated with a main gear 107. The main gear 107 transmits part of the driving force via a reel reduction gear train 108 to the reel shaft 102 for one route of transmission, and the rest of the driving force via a roller reduction gear train 109 to the roller shaft 103 for the route of transmission.

The output shaft 104 of the drive motor 101 has a clutch arm 110 rotatably supported thereon, and the driving force-transmitting gear 106 is rotatably supported on the clutch arm 110. The clutch arm 110 rotates with rotation of the output shaft 104 in a free-running manner, thereby causing the driving force-transmitting gear 106 to be mated with the main gear 107 in a disengageable manner. That is, when the driving motor 101 rotates, the clutch arm 110 rotates to cause the driving force-transmitting gear 106 to mate with the main gear 107, thereby causing the driving force of the drive motor 101 to be transmitted to the take-up reel 13 and the platen roller 57. Inversely, when the drive motor 101 is not in operation, if torque is input from the take-up reel 13 or the platen roller 57, the driving force-transmission gear 106 is moved away from the main gear 107 to be disengaged therefrom.

This makes it possible to easily pull the plate-making sheet B alone from the apparatus since the platen roller 57 readily rotates (reversely) without receiving any load of the drive motor 101, when the plate-making sheet B is erroneously inserted into the stamp-making apparatus. Alternatively, the clutch 110 may be rotated in a manner linked to the switching operation of the function switch 8. It should be noted that the reel shaft 102 is a slide shaft which absorbs a change in the circumferential speed of the taken-up reel 13 in an increasing direction as the ink ribbon C is taken up by the take-up reel 13 by occurrence of sliding.

Next, with reference to FIGS. 4 to 8, the function link mechanism 62 will be described in detail. The function link mechanism 62 is comprised of a frame 121, the lid-opening link 62*a* rotatably supported by the frame 121 in a state extending perpendicular to the frame 121, the head-moving link 62*b* in the form of a plate rotatably supported on the frame 121, the ribbon-holding link 62*c* in the form of a plate supported on the frame 121 in a manner movable forward and backward, the main link 62*d* in the form of a plate rotatably supported on the frame 121, and a ribbon-holding cam 122 interposed between the main link 62*d* and the ribbon-holding link 62*c*. Various kinds of gears of the ribbon feeder 61 are arranged between the frame 121 and the ribbon-holding link 62*c*, and the main link 62*d* is arranged below the frame 121 in a manner extending along therewith.

The main link 62*d* is engaged with an eccentric pin 123 of the function switch 8 on an input side, and is rotated about a support shaft 124 by rotation of the function switch 8 in a normal or reverse direction. The main link 62*d* has a tongue 125 integrally formed therewith at an extreme end on an output side, with a first pin 126 provided at a forward end, and a second pin 127 provided at a root of the tongue 125. The tongue 125 is engaged with a lower portion of the lid-opening link 62*a*, the first pin 126 is engaged with the head-moving link 62*b*, and further, the second pin 127 is engaged with the ribbon-holding link 62*c* via the ribbon-holding cam 122.

Figure 8:
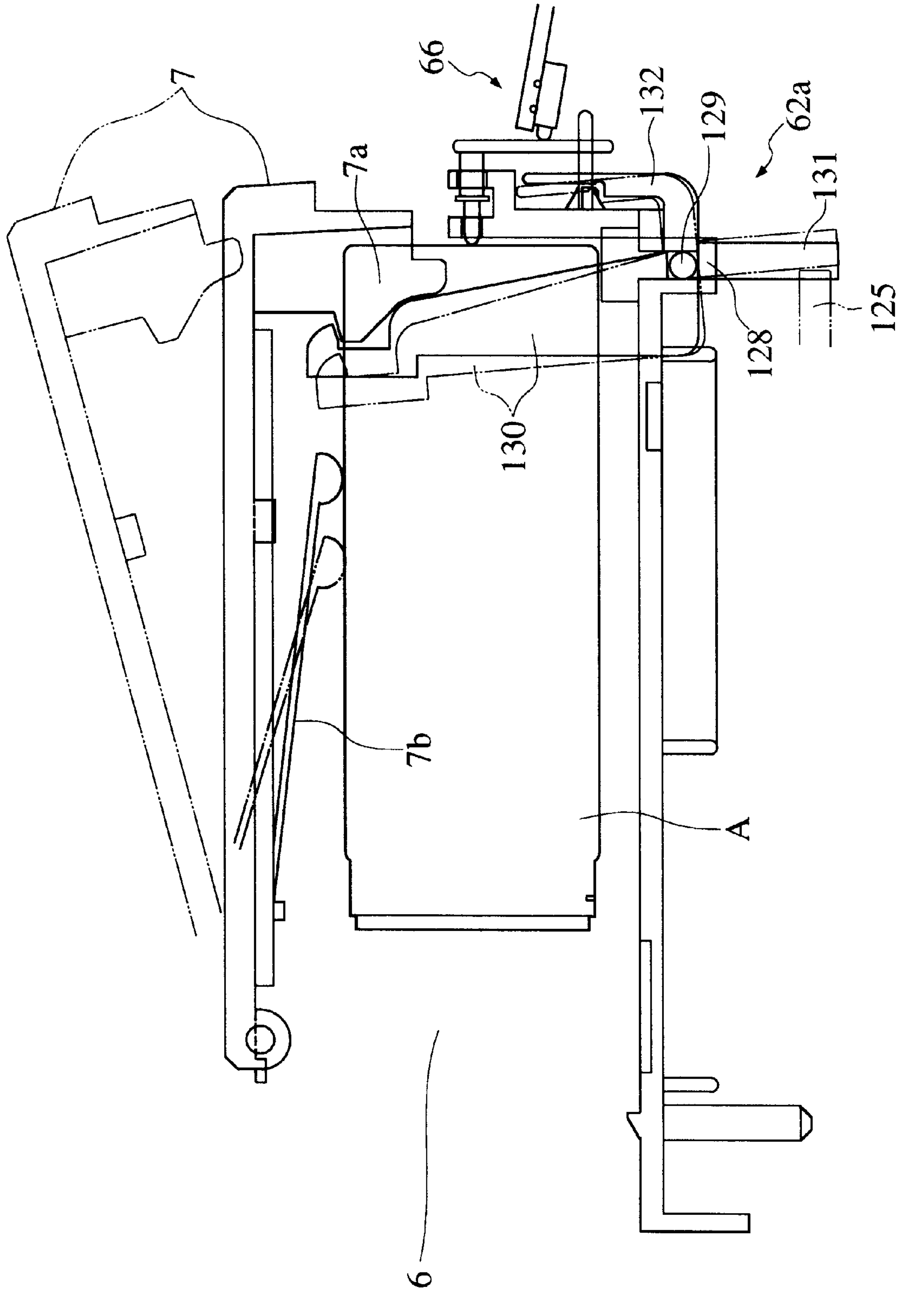
FIG. 8 is a side elevation showing a lid-opening link of the function link mechanism and component parts associated therewith.

The lid-opening link 62*a* is a unitary member comprised of an opening link body 128, a pair of support shafts 129, 129 formed at opposite longitudinal ends of the opening link body 128 in a manner projecting therefrom, a pair of hooks 130, 130 extending from the opposite ends of the opening link body 128 toward the lid 7, a lever 131 extending downward from the opening link body 128 in a manner corresponding to the tongue of the main link 62*d*, and a switching operation portion 132 which extends forward from the opening link body 128 in a bending manner (see FIG. 8). A coiled spring 133 is stretched between the lever 131 and the frame 121 whereby the lid-opening link 62*a* is urged for rotation in such a direction that the tip of a hook 130 thereof is hooked on a hook catch 7*a* of the lid 7.

When the function switch 8 is rotated from the "OFF" position to the "OPEN" position, the tongue 125 of the main link 62*d* is rotated forward to push the lever 131 of the lid-opening link 62*a* against the pulling force of the coiled spring 133 whereby the hook 130 is disengaged from the hook catch 7*a*. The underside of the lid 7 has a plate spring 7*b* mounted thereon for stably retaining the stamp body A received in the pocket 6. When the hook 130 is disengaged, the lid 7 is popped upward by a reactionary force of the urging force of the plate spring 7*b* acting on the stamp body A (see FIGS. 5 and 8). Even when no stamp body A is received within the pocket 6, the lid 7 is popped upward by the action of a lock member 171 of a lock mechanism 63 described hereinafter (see FIG. 10) when the function switch 8 is turned to the "OPEN" position.

When the lid-opening link 62*a* is disengaged from the lid 7, the switching operation portion 132 causes detecting ends of the detecting device 66 to project into the pocket 6. Then, when the function switch 8 rotated to the "OPEN" position is released, the coiled spring 133 acts by way of the lid-opening link 62*a* and the main link 62*d* such that the function switch 8 automatically returns from the "OPEN" position to the "OFF" position. On the other hand, when the lid 7 is closed, it is pushed toward the pocket 6 against the urging force of the plate spring 7*b*, whereby the hook 130 of the lid-opening link 62*a* climbs on the hook catch 7*a* to be hooked thereon.

The head-moving link 62*b* incorporates the print head 56 at one end thereof, and arranged such that it is rotated about a support shaft 135 provided at a holding portion of the print head 56. The head-moving link 62*b* is formed with an engaging surface 136 at a tail end thereof, which is brought into contact with the first pin 126 of the main link 62*d*, and a coiled spring 137 is stretched between the tail end of the head-moving link 62*b* and the frame 121. The coiled spring

137 urges the one end of the head-moving link 62*b* for rotation about the support shaft 135 toward the platen roller 57, and at the same time rotationally urges the engaging surface 136 against the first pin 126. The engaging surface 136 includes a sloped surface 138, a first stationary surface 139 provided on the one end side of the sloped surface 138 in a manner forming an arcuate surface concentric with the support shaft 124 of the main link 62*d* and a second stationary surface 140 provided on the tail end side of the sloped surface 138. When the first pin 126 is brought into-contact with the second stationary surface 140 through rotation of the main link 62*d*, the print head 56 is away from the platen roller 57, whereas when the first pin 126 faces the first stationary surface 139, the print head 56 is in contact with the platen roller 57. When the ribbon cartridge 11 is mounted or removed, the head-moving link 62*b* is further rotated by means of a jig, not shown in the figure, in such a direction that the print head 56 is moved away from the platen roller 57.

Figure 6:
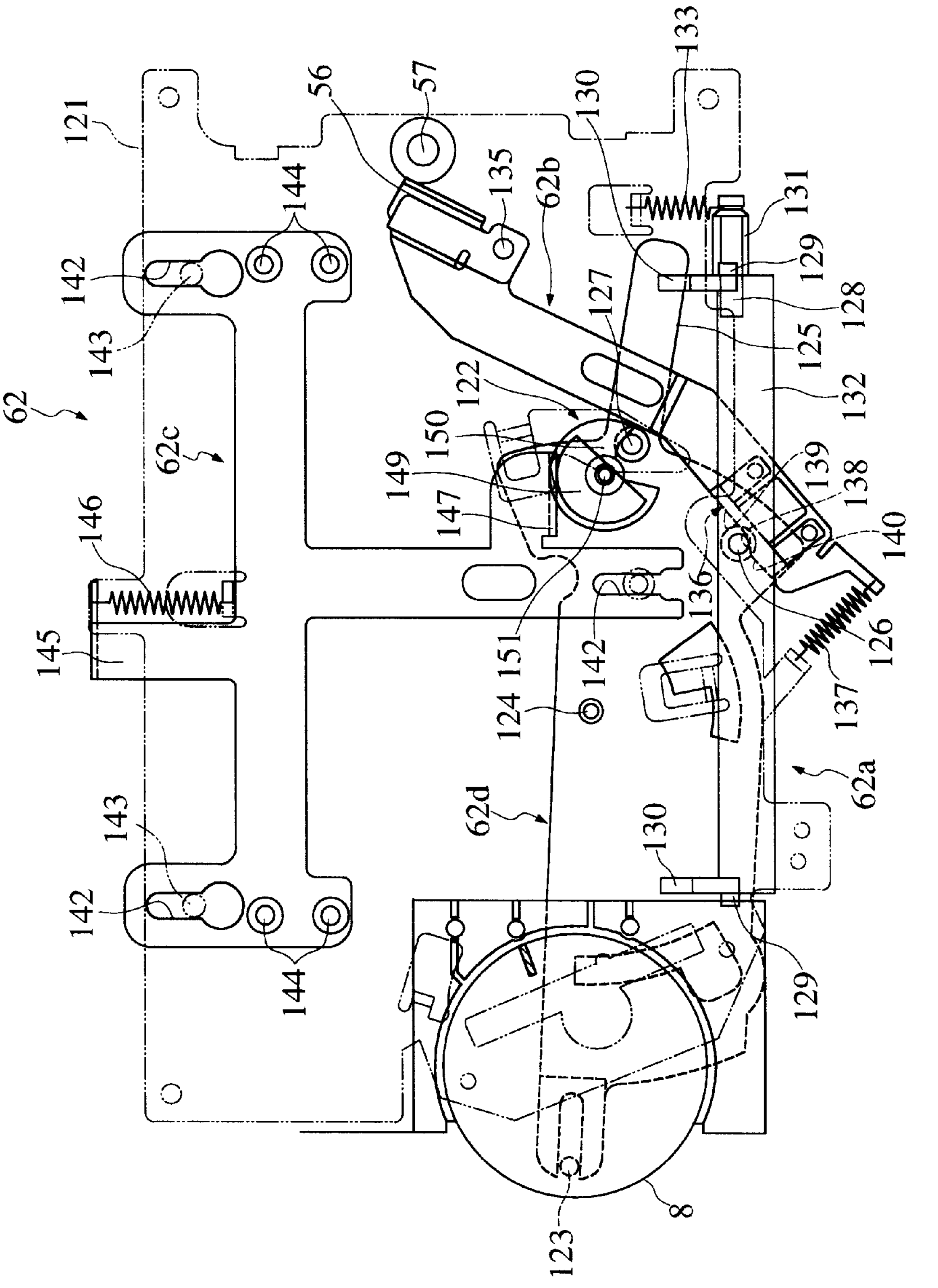
FIG. 6 is a plan view showing the function link mechanism in its "INPUT/PLATE-MAKING" position.

When the function switch 8 is rotated from the "OFF" position to the "INPUT/PLATE-MAKING" position as shown in FIG. 6, the first pin 126 of the main link 62*d* is moved from the second stationary surface 140 down the sloped surface 138 to the first stationary surface 139, whereby the head-moving link 62*b* is moved by the pulling force of the coiled spring 137 to urge the print head 56 against the platen roller 57. Inversely, when the function switch 8 is rotated from the "INPUT/PLATE-MAKING" position to the "OFF" position, the first pin 126 is moved from the first stationary surface 139 up the sloped surface 138 to the second stationary surface 140, whereby the head-moving link 62*b* is rotated against the pulling force of the coiled spring 137 to move the print head 56 away from the platen roller 57.

Figure 7:
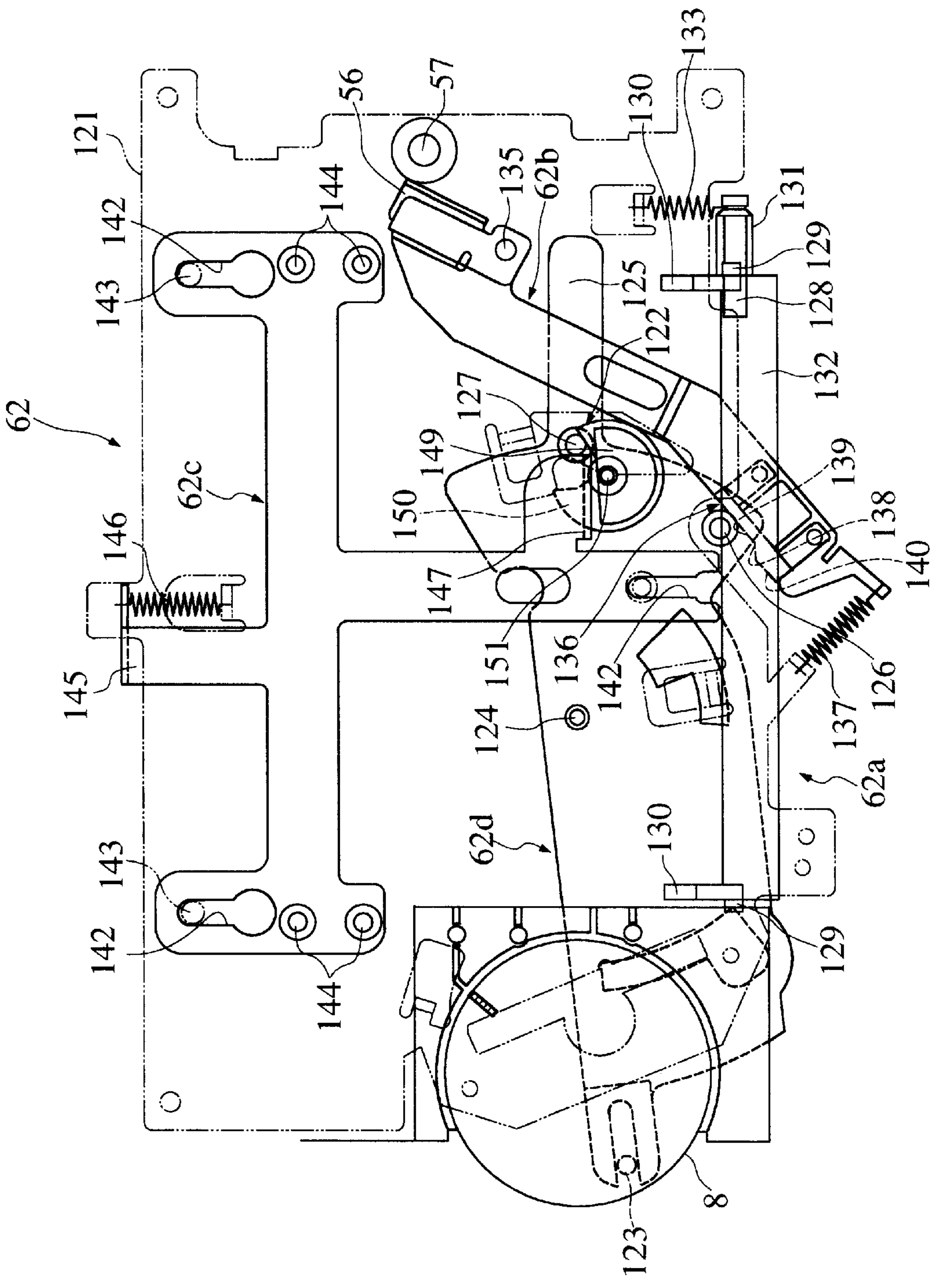
FIG. 7 is a plan view showing the function link mechanism in its "EXPOSURE" position.

When the function switch 8 is further rotated from the "INPUT/PLATE-MAKING" position to the "EXPOSURE" position, the first pin 126 is further moved on the first stationary surface, whereby the print head 56 remains in contact with the platen roller 57 (see FIG. 7). Similarly, when the function switch 8 is rotated from the "OFF" position to the "OPEN" position, the first pin 126 is moved further toward the front side on the second surface 140, whereby the print head 56 remains away from the platen roller 57 (see FIG. 5). When the coiled spring 137 has brought the print head 56 into contact with the platen roller 57, the first pin 126 is slightly away from the first stationary surface 139, whereby the print head 56 is positively held in contact with the platen roller 57.

The ribbon-holding link 62*c* is generally T-shaped, and has each of left, right, and forward end portions thereof formed with a guide slot 142. The guide slots 142 are respectively engaged with three projections 143 erected on the frame 121, whereby the ribbon-holding link 62*c* is mounted on the frame 121 in a state slightly floated on the frame 121 such that it can be moved forward and backward. Each guide slot 142 is in the form of a key hole, while the projection 143 is formed with a disk-shaped retaining portion, not shown, at an upper end thereof. The ribbon-holding link 62*c* is mounted in the frame 121 by positioning the retaining portion to a circular portion of the guide slot 142 and then pushing the former into the latter, whereby the ribbon-holding link 62*c* is guided forward and backward by the projections 143 of the frame 121 each sliding along an elongate slot portion of a corresponding one of the guide slots 142. Further, the ribbon-holding link 62*c* has two support pins 144, 144 erected on each of the right and left ends thereof outside the guide slots 142, and the presser plate 58 and the first and second guide pins 53, 54 are mounted on the support pins 144, 144 (see FIG. 13).

From an intermediate portion of the ribbon-holding link 62*c*, a spring-holding piece 145 having a bent end portion extends backward, and a coiled spring 146 is interposed between the spring-holding piece 145 and the frame 121. The coiled spring 146 urges the ribbon-holding link 62*c* in a forward direction, i.e. toward the front end of the stamp-making apparatus. From a front-side portion of the ribbon-holding link 62*c* branches an engaging portion 147 which the ribbon-holding cam 122 abuts.

The ribbon-holding cam 122 is a unitary member having an upper cam 149 and a lower cam 150 in the form of a laminate of two plate cams. The ribbon-holding cam 122 is rotatably mounted on the frame 21 via a support shaft 151. The lower cam 150 is in the shape of a circular disk from which a sector-shaped portion is cut out, while the upper cam 149 is in the shape of a semicircular disk. The engaging portion 147 of the ribbon-holding link 62*c* is in contact with the peripheral end of the upper cam 149, and the second pin 127 of the main link 62*d* is engaged with a cut-out portion of the lower cum 150 (see FIG. 6).

FIG. 6 shows the function switch 8 in the "INPUT/PLATE-MAKING" position. When the function switch 8 is rotated from this position to the "EXPOSURE" position, the second pin 127 of the main link 62*d* pushes one radial end wall of the cut-out portion of the lower cam 150 to move or rotate the ribbon-holding cam 122 in an anticlockwise direction. This rotation of the ribbon-holding cam 122 eventually causes the engaging portion 147 of the ribbon-holding link 62*c* to drop from a peripheral end portion of the upper cam 149 onto a chord portion of the same, whereby the ribbon-holding link 62*c* is displaced forward by the urging force of the coiled spring 146. Since the ribbon-holding cam 122 is constructed such that it is freely rotatable about its rotational axis, so that it is instantly rotated to a position in which the chord portion of the upper cam 149 and a contacting surface of the engaging portion 147 of the ribbon-holding link 62*c* entirely face each other. This rotation also brings the other radial end wall of the cut-out portion of the lower cam 150 to a position in substantial contact with the second pin 127 (see FIG. 7).

The guide slot 142 also serves as a stopper for restricting the forward movement of the ribbon-holding link 62*c*. That is, when an inner wall defining the rear end of the elongate slot of each guide slot 142 strikes the projection 143, the ribbon-holding link 62*c* is stopped in a forward extremity position. Therefore, when the engaging portion 147 of the ribbon-holding link 62*c* entirely faces the chord portion of the upper cam 149, the urging force of the coiled spring 146 does not actually act on the chord portion of the upper cam 149, so that the engaging surface of the engaging portion is slightly spaced from the chord portion of the upper cam 149.

On the other hand, when the function switch 8 is rotated from the "EXPOSURE" position through the "INPUT/PLATE-MAKING" position to the "OFF" position, the second pin 127 displaces the other radial end wall of the cut-out portion of the lower cam 150 to rotate the ribbon-holding cam 122 in a clockwise direction. This rotation of the ribbon-holding cam 122 causes the engaging portion 147 of the ribbon-holding link 62*c* to return from the chord portion of the upper cam 149 to the peripheral end portion of the same, whereby the ribbon-holding link 62*c* is moved backward against the urging force of the coiled spring 146. In this state, the ribbon-holding cam 122 which is freely rotatable supports the ribbon-holding link 62*c* urged by the coiled spring 146 to thereby hold the ribbon-holding link 62c in a backward position (see FIG. 4). When the function switch 8 is further moved from the "OFF" position to the "OPEN" position, the other radial end wall of the cut-out portion of the lower cam 150 is in contact with the second pin 127 become substantially parallel with a direction of movement of the second pin 127, so that the ribbon-holding cam 122 only rotates slightly in a clockwise direction, and the ribbon-holding link 62c remains held in the backward position (see FIG. 5).

Thus, when the function switch 8 is rotated from the "OFF" position to the "OPEN" position, the hook 130 is disengaged from the hook catch 7a of the lid 7 to permit the lid 7 to open, and when the same is rotated from the "OFF" position to the "INPUT/PLATE-MAKING" position, the print head 56 displaces the ink ribbon C to urge same against the platen roller 57 to permit printing. Further, when the function switch 8 is rotated from the "INPUT/PLATE-MAKING" position to the "EXPOSURE" position, the presser plate 58 displaces the ink ribbon C to urge the same against the stamp body A to permit exposure. If the lid 7 is carelessly opened during exposure to ultraviolet rays, or if the exposure is carried out with the lid 7 being open, ultraviolet rays undesirably leak out of the apparatus. To avoid this inconvenience, the stamp-making apparatus incorporates the lock mechanism 63 which locks the lid 7 in a closed state during printing and exposure, and inhibits the function of the apparatus from shifting to printing and exposure when the lid 7 is open.

Figure 9B:
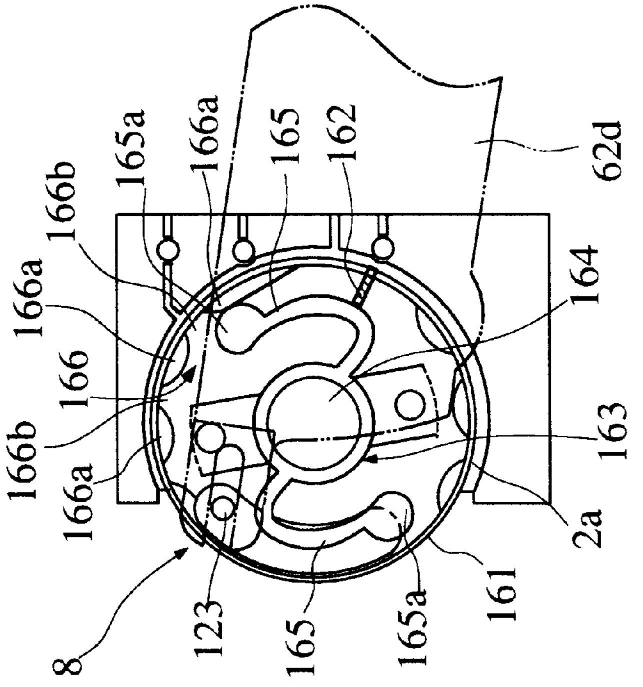
FIGS. 9A and 9B are views each showing an internal construction of a function switch, which are useful in explaining operations thereof.
Figure 9A:
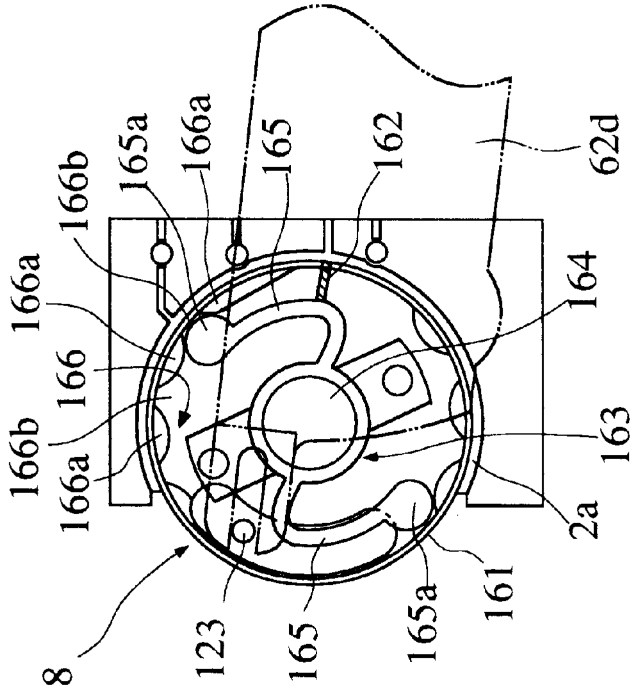

The lock mechanism 63 is arranged in the function switch 8. Now, for easy understanding purposes, description will be first made of the construction of the function switch 8. As shown in FIGS. 9A and 9B, the function switch 8 includes a dial 161 formed with a mark 162 on its top for indicating an active position of the switch, a click member 163 attached to the underside of the dial 161 and received in the space within the same, and an eccentric pin 123 in engagement with the main link 62d. The function switch 8 is rotatably mounted on a seat plate 2a of the casing 2, via a shaft 164. The click member 163 has a pair of click arms 165, 165 extending radially in a winding manner, and positioned in centrosymmetry. The resilient properties of each click arm 165 urges a circular portion 165a at an end thereof against a corresponding one of click-engaging portions 166 formed on the seat plate 2a.

Each click-engaging portion 166 is a sequence of four convex portions 166a and three concave portions 166b each located between adjacent ones of the convex portions 166a. States of the circular portion 165a of each click arm dropped in or engaged with any of the three concave portions 166b of the corresponding click-engaging portion 166 correspond to the "OFF" position, the "INPUT/PLATE-MAKING" position, and the "EXPOSURE" position, respectively (see FIG. 9A). An intermediate portion of the outermost convex portion corresponds to the "OPEN" position, and in this position, no clicking engagement occurs between the click arms and the click-engaging portions (see FIG. 9B). This enables the function switch 8 to automatically smoothly return from the "OPEN" position to the "OFF" position. A rotational angle between the "OFF" position and the "OPEN" position through which the function switch 8 should rotate is set to 15 degrees, and a rotational angle between the "OFF" position and the "EXPOSURE" position is set to 30 degrees.

Figure 10:
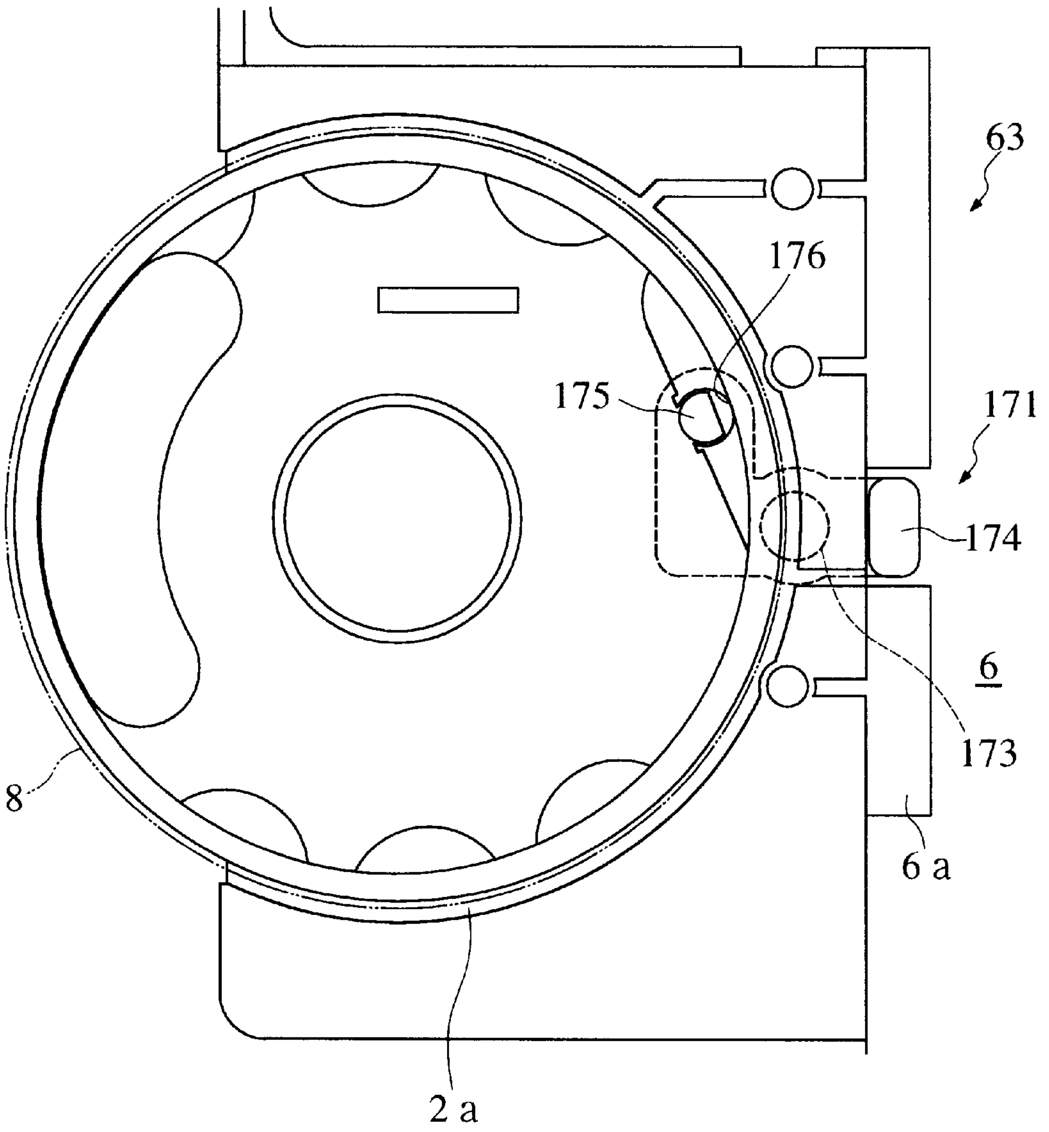
FIG. 10 is a plan view of a lock mechanism and component parts associated therewith from which a dial of the function switch is removed.
Figure 11:
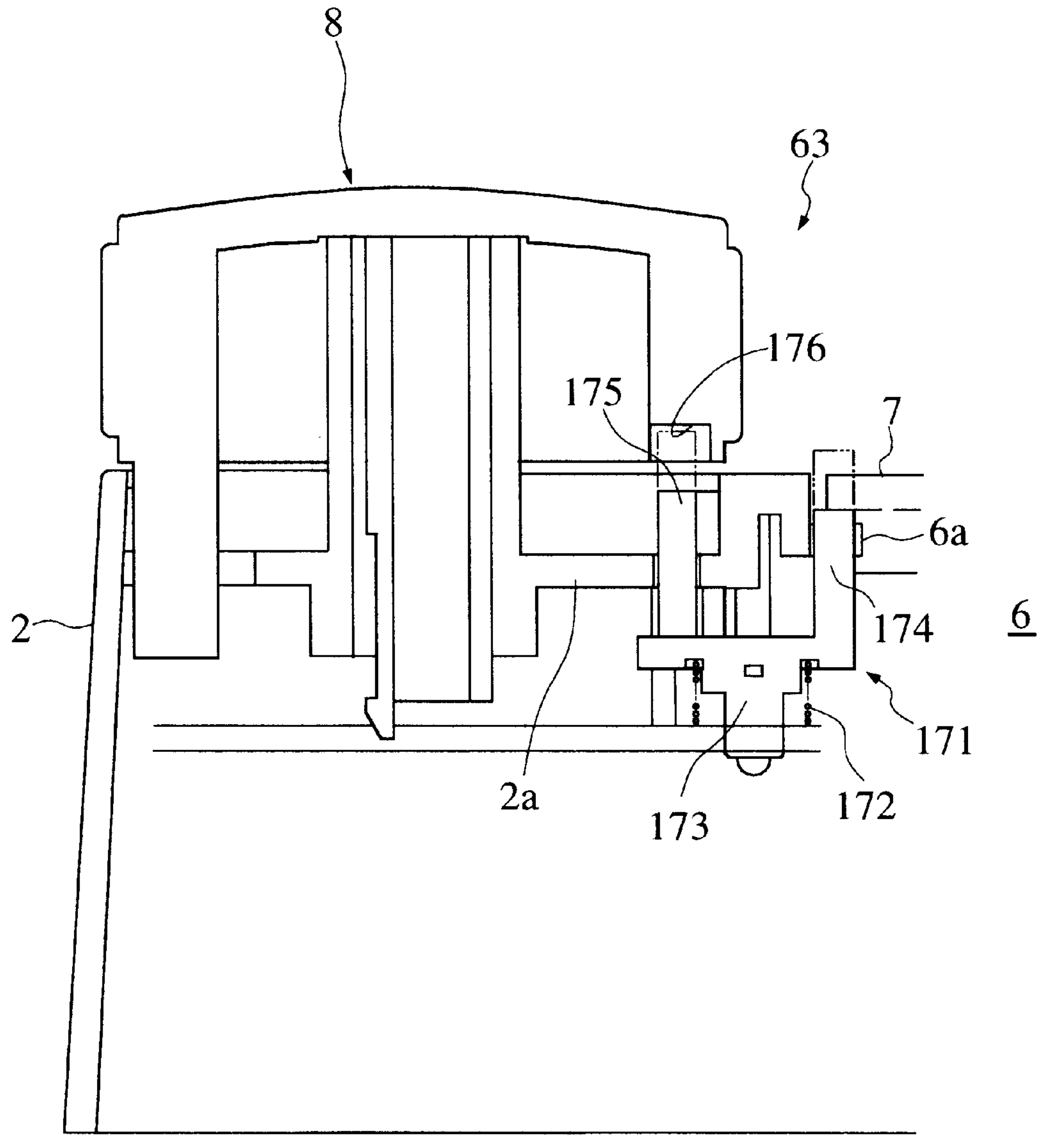
FIG. 11 is a cross-sectional view showing the function switch and the lock mechanism as well as component parts associated therewith.

On the other hand, as shown in FIGS. 10 and 11, the lock mechanism 63 includes the lock member 171 arranged in a boundary between the function switch 8 and the pocket 6. The lock member 171 is mounted on the seat plate 2a of the casing 2 such that it is urged upward by a lock spring 172 and is vertically movable. The lock member 171 is comprised of a body 173 guided by the seat plate 2a in a vertically movable manner, a push arm 174 which extends from the body 173 toward the pocket 6 and then bends upward, and a lock arm 175 which extends from the body 173 toward the function switch 8 and then bends upward.

The push arm 174 faces a lid-seating portion 6a of the pocket 6 from below, and when the lid 7 is opened, the push arm 174 projects out of the lid-seating portion 6a, whereas when the lid 7 is closed, the push arm 174 is pushed downward to be retracted into the lid-seating portion 6a. That is, when the lid 7 is opened, the lock member 171 is displaced upward by the lock spring 172, and when the lid 7 is closed, the lock member 171 is moved downward against the urging force of the lock spring 172. When the lock member 171 is moved upward, the lock arm 175 is engaged in an engaging groove 176 formed in a side wall of the function switch 8, to inhibit rotation of the function switch B. Inversely, when the lock member 171 is moved downward, the lock arm 175 is disengaged from the engaging groove 176 of the function switch 8 to cancel the inhibition of rotation of the function switch 8.

The engaging groove 176 is an elongate groove which extends circumferentially, and when the function switch 8 is to be rotated between the "OFF" position and the "OPEN" position (normally, this operation is not carried out), the rotation of the function switch 8 is permitted. Inversely, when an attempt is made to rotate the function switch 8 from the "OFF" position to the "INPUT/PLATE-MAKING" position or the "EXPOSURE" position, the rotation of the function switch 8 is inhibited. This construction of the lock mechanism inhibits the rotation of the function switch 8 when the lid 7 is open, thereby making it impossible to start printing and exposure.

The mechanism of locking the lid in a closed state during printing and exposure by the stamp-making apparatus is achieved by the main link 62d and the lid-opening link 62a. That is, when the function switch 8 is in the "INPUT/PLATE-MAKING" position or the "EXPOSURE" position, the lid is locked in a closed state by the lid-opening link 62a. This prevents the exposure from being carried out when the lid 7 is open, and the lid from being opened during the exposure.

Figure 12:
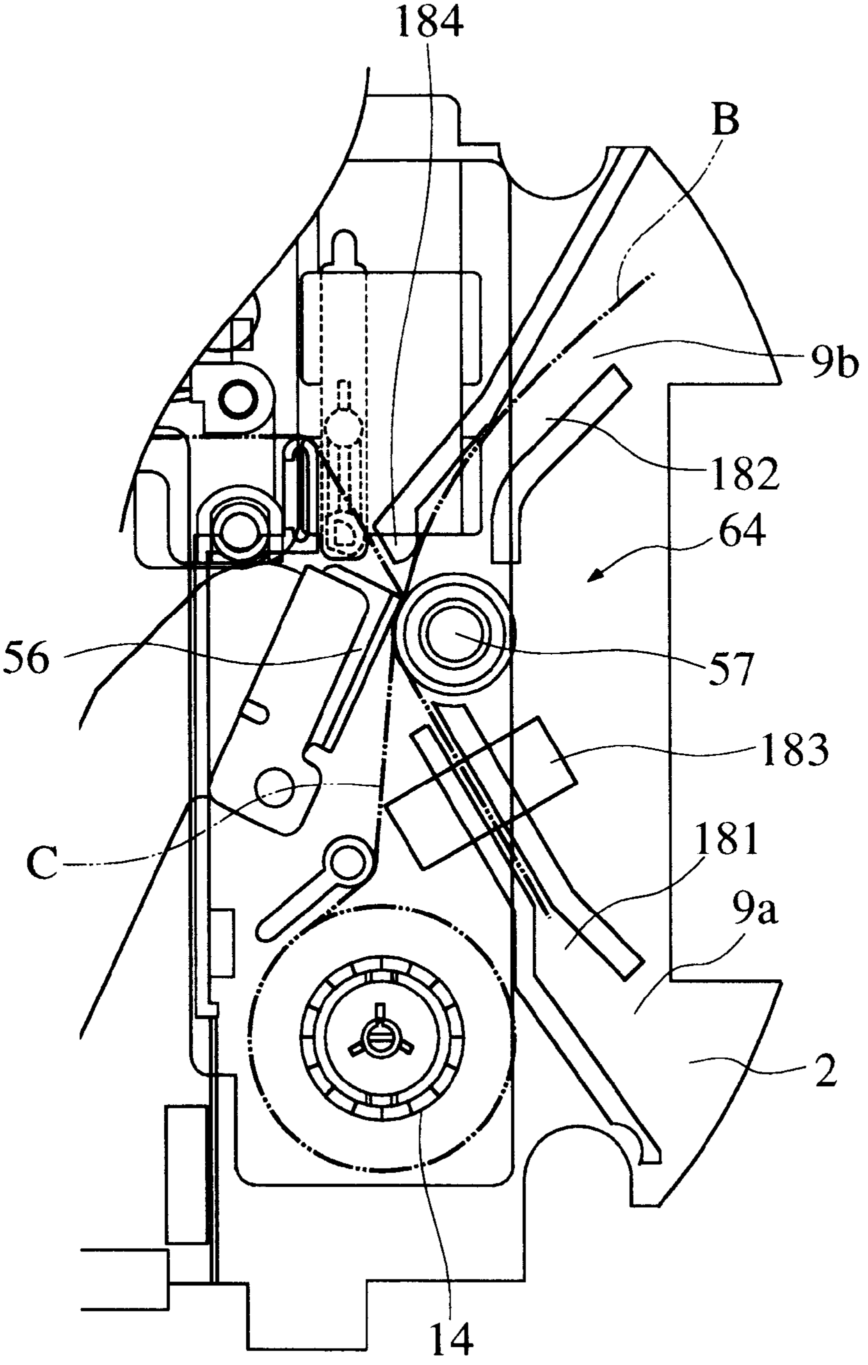
FIG. 12 is an enlarged plan view showing a printing device of the mechanical block and component parts associated therewith.

Next, a printing device 64 provided for the printing block will be described with reference to FIG. 12. The printing device 64 includes the print head (printing mechanism) 56 for printing stamp characters on the ink ribbon C, and the platen roller (feeding mechanism) 57 for feeding the ink ribbon C in a manner timed to printing operations of the print head 56. Further, the casing 2 is formed with a feeding passage 181 through which the plate-making sheet B is fed to a contacting area between the print head 56 and the platen roller 57 and a delivery passage 182 through which the plate-making sheet B is delivered. The feeding passage 181 is formed with the inserting slot 9a which is open to the outside of the apparatus, at an upstream end thereof, and the delivery passage 182 is formed with the take-out slot 9b which is open to the outside of the apparatus, at a downstream end thereof.

The platen roller 57 is a drive roller as described hereinabove, and when the ink ribbon C is rolled out from the supply reel 14, it pulls in the plate-making sheet B between the print head 56 and itself to thereby bring a portion of the ink ribbon C and a portion of the plate-making sheet B, one upon the other, onto the print head 56. The print head 56 is a thermal head, and thermally transfer ink coated on the ribbon tape of the ink ribbon C to the plate-making sheet B. This transfer of the ink peels a portion of ink corresponding to a stamp character off the ink ribbon C to reveal a corresponding portion of the transparent base of the ribbon tape, while the peeled portion of the ink is attached to the plate-making sheet B as the stamp character.

On the feeding passage 181 faces a sensor 183 which detects insertion of the plate-making sheet B and a feeding reference position of the same. The plate-making sheet inserted into the feeding passage 181 is sent forward by the platen roller 57 in response to results of the detection of the sensor 183 whereby printing is started from one end of the stamp character label Bd on the plate-making sheet. One of walls defining the delivery passage 182 on a left-hand side, as viewed in FIG. 12, is formed with a separating nail 184 at an upstream end thereof, whereby the ink ribbon C and the plate-making sheet B fed one upon the other are separated from each other. Thereafter, the ink ribbon C is sent forward to the exposure block, while the plate-making sheet B is delivered via the delivery passage 182 out of the apparatus.

Now, the structure of the plate-making sheet B will be described, and the relationship between the plate-making sheet B and the above described printing device will be described in detail.

As shown in FIG. 33, the plate-making sheet B is a laminate of a base sheet Ba and an adhesive sheet Bb, generally in the form of a strip having two longer-sides and two shorter-sides. The adhesive sheet Bb is formed with cutting lines Bc in the middle thereof, defining a rectangular area. That is, the rectangular area of the adhesive sheet Bb is peeled off the base sheet Ba along the cutting lines Bc to form a stamp character label Bd which is affixed to the back of the stamp. The plate-making sheet B is formed with a pair of through holes Be outside both ends of the stamp character label Bd, at respective centrosymmetric locations with respect to the center of the label Bd. The pair of through holes Be are provided at respective locations of the plate-making sheet B displaced from a longitudinal center line toward the longer sides, and each have a substantially rectangular shape. The base sheet Ba is a so called peel-off sheet for use with the adhesive sheet Bb.

A direction along the longer-sides of the plate-making sheet B is a feeding direction of the sheet B. When the plate-making sheet B is inserted into the feeding passage 181, a sensor 183 first detects one end of the plate-making sheet B in a longitudinal direction along the longer-sides (one end corresponding to one of the shorter-sides thereof), and then detect one of the pair of through holes Be. The sensor 183 is formed by an optical sensor such as a photo-interrupter. When one end in the longitudinal direction along the longer-sides of the plate-making sheet B is positioned in an optical path to the sensor 183 to block the light to be received by the sensor 183 (i.e. when the output voltage of the sensor 183 is at a trailing edge), the existence of the plate-making sheet B is detected. Then, when one of the pair of through holes Be of the plate-making sheet B is positioned in the optical path to the sensor 183 to permit the light to pass through the through hole Be to the sensor 183 (i.e. when the output voltage of the sensor 183 is at a rising edge), the existence of the through hole Be is detected. Alternatively, the existence of the through hole Be may be detected by a trailing edge of the output voltage, or by both of the rising edge and the trailing edge.

And, when the existence of the plate-making sheet B is detected, the platen roller 57 starts to be rotated whereby the feeding of the inserted plate-making sheet B is started. If the existence of the through hole Be is detected properly when the sheet B is fed by predetermined number of steps (corresponding to a predetermined time period), it is determined that the plate-making sheet B is set with its front and back surfaces on their proper sides. After this detection, when the plate-making sheet B is fed by several steps, the printing by the print head 56 is started. As described above, in the plate-making sheet B, stamp characters are printed on the stamp character label Bd of the adhesive sheet Bb. Therefore, the plate-making sheet B has a right side to face toward the print head 56, so that it is necessary to prevent the sheet B from being inserted with its front and back in an inverted state.

Further, as described hereinafter, there are a plurality of kinds of the plate-making sheet which are different in the size of the stamp character label Bd. Therefore, first, the one end of the plate-making sheet B inserted is detected to start a auto-feed of the same, and then front and back surfaces of the sheet B are detected by one of the through holes Be. If no hole Be is detected when the plate-making sheet B is fed by the predetermined number of steps (corresponding to the predetermined time period) after the start of the auto-feed, it is determined that the plate-making sheet 9 is set with its front and back surfaces on the wrong sides. Upon the determination, the platen roller 57 is stopped from rotation and warning is produced. In this connection, the plate-making sheet B starts to be printed from a different position depending on the size of the stamp character label B. Therefore, to start the printing properly, the start position of printing is calculated based on the data of entered characters, and the plate-making sheet B is fed by a number of steps determined as a result of the calculation, from the position at which one of the through holes Be is detected, whereupon the printing is started.

Thus, as the plate-making sheet B is formed with a pair of through holes Be, it is possible to determine whether or not the sheet B is inserted with its front and back surfaces facing in respective proper directions i.e. on their right sides and to print images of the stamp characters accurately on the stamp character label Bd. Further, since the through holes Be are provided in pair in respective centrosymmetric locations, it is not necessary to determine whether either end of the plate-making sheet B is a forward end. That is, as the stamp character label Bd is formed in the middle of the plate-making sheet B and a pair of through holes Be are formed at respective centrosymmetric locations with respect to the center of the label Bd, it is possible to insert both ends of the plate-making sheet B in a direction along the longer-sides of the plate-making sheet B (both ends corresponding to the shorter-sides thereof) into the feeding passage 181 as a forward end. In the plate-making sheet B of the present embodiment, although not shown in the figure, the base sheet Ba is made with an achromatic color and the adhesive sheet Bb is made with a chromatic color, whereby it is possible to discriminate the front surface from the back surface by their colors.

Figure 31:
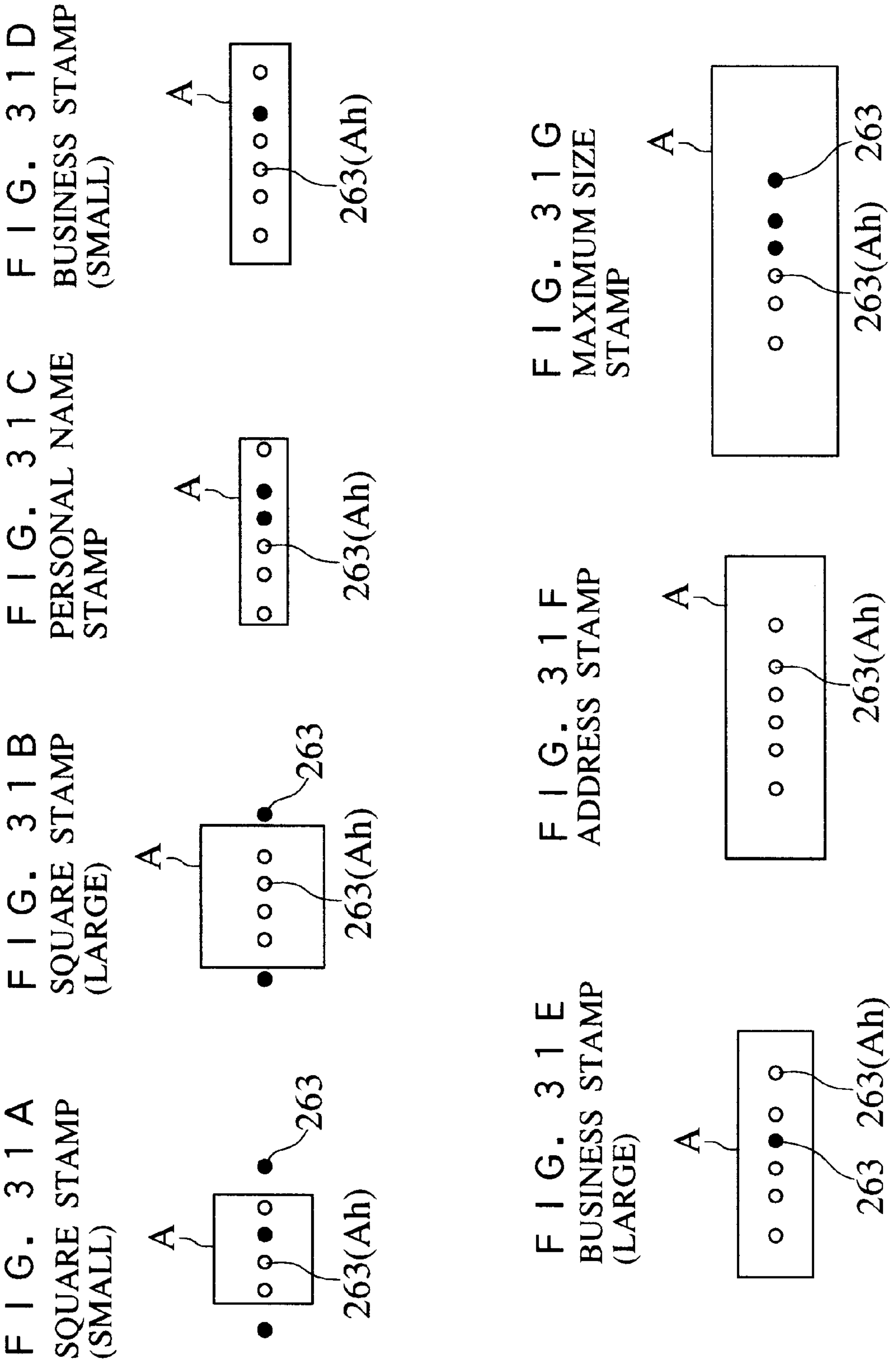
FIG. 31A is a diagram showing a pattern for discriminating a stamp body of a small square stamp.
FIG. 31B is a diagram showing a pattern for discriminating a stamp body of a large square stamp.
FIG. 31C is a diagram showing a pattern for discriminating a stamp body of a personal name stamp.
FIG. 31D is a diagram showing a pattern for discriminating a stamp body of a small business stamp.
FIG. 31E is a diagram showing a pattern for discriminating a stamp body of a large business stamp.
FIG. 31F is a diagram showing a pattern for discriminating a stamp body of an address stamp.
FIG. 31G is a diagram showing a pattern for discriminating a maximum size stamp body.

There are provided several types of the stamp body A which are different in shape (particularly the shape of the stamp surface Ad) from each other so as to meet needs of stamps (see FIGS. 31A to 31G and 32), and there are also provided respective corresponding types of the plate-making sheet B which are different in the shape of the stamp character label Bd (shape of an area defined by the cutting lines Bc). The stamp character label Bd defined by the cutting lines Bc on the plate-making sheet B shown by the solid lines in FIG. 33 is for a comparatively large stamp body of an address stamp shown in FIG. 31F, while the larger one of the other two stamp character labels Bd shown by phantom lines in the figure is for a stamp body of a business stamp (large business stamp), and the smaller one of the same is for a stamp body of a personal name stamp.

Thus, for the stamp-making apparatus 1 of the present embodiment, several types of the plate-making sheet B are provided as members of the plate-making sheet group which have respective different colors of the adhesive sheets Bb. That is, the adhesive sheets Bb have chromatic colors, as described above, which are selected such that different types of the plate-making sheet B are distinguished from each other by these colors. Therefore, although the plate-making sheets B have quite the same contour, it is possible to discriminate each type of plate-making sheet B from the rest by a different color of the adhesive sheet Bb, and it is possible to discriminate the front surface and the back surface of the plate-making sheet B from each other by respective chromatic and achromatic colors. Alternatively, the base sheet Ba may be formed with a chromatic color, and the adhesive sheet Bb with an achromatic color.

When the printing is completed, the platen roller 57 feeds the plate-making sheet B forward together with the ink ribbon C having negative images formed thereon, whereby the plate-making sheet B is discharged from the apparatus from the take-out slot 9*b*, while the ink ribbon C is fed or advanced to a position (exposure block) facing the stamp body A set in the pocket 6 of the mechanical block 4. The user judges that the printing is completed when the plate-making sheet B is completely discharged or released from the apparatus, and then he operates the apparatus to execute the exposure. Therefore, if the ink ribbon C does not reach the exposure block but is still being fed when the plate-making sheet B is completely discharged or released from the apparatus, there is a possibility that the exposure is executed during feeding of the ink ribbon C. Inversely, if the ink ribbon C has reached the exposure block but the plate-making sheet B is not completely discharged from the apparatus, the user is required to pull the plate-making sheet B out of the apparatus, resulting in a possibility that the ink ribbon C is made loose.

Figure 34A:
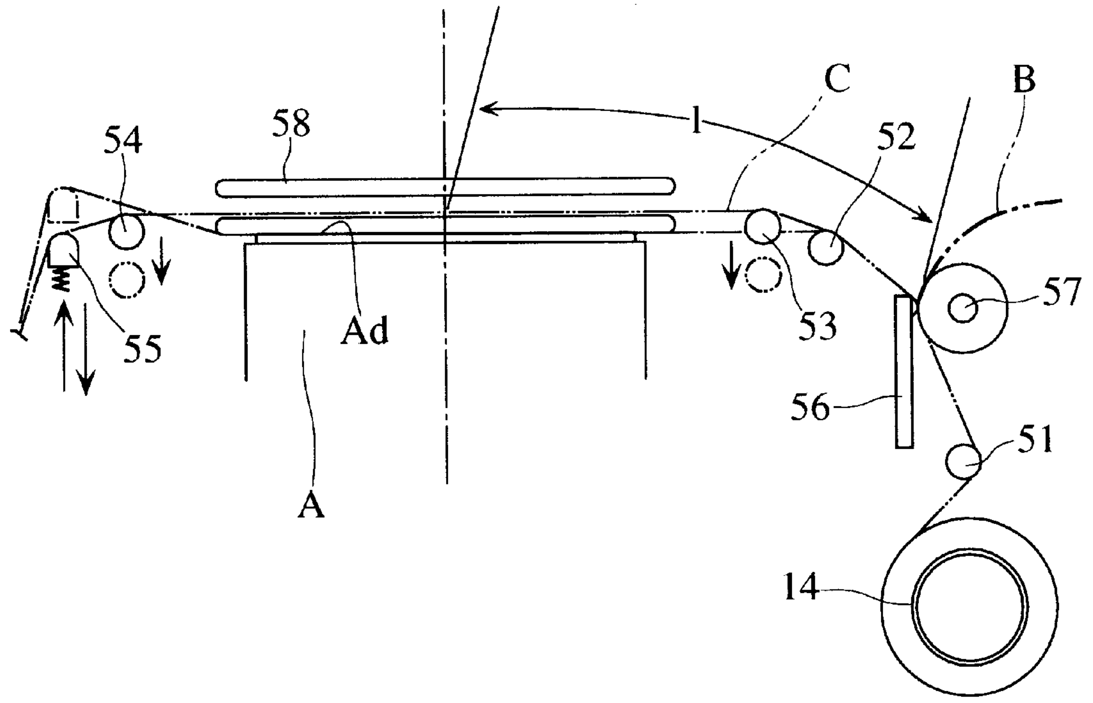
FIGS. 34A and 34B are diagrams which are useful in explaining a relationship between the length of the plate-making sheet and the position of the stamp body set in the pocket of the mechanical block.
Figure 34B:
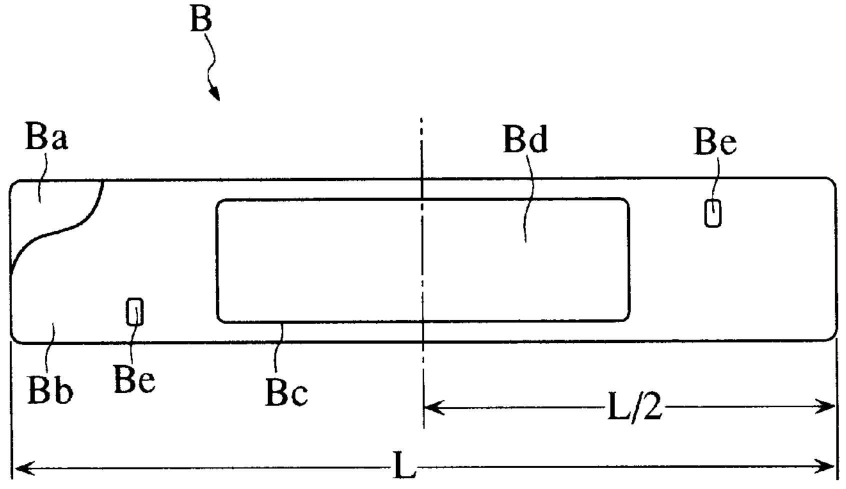

To eliminate the possibility of these inconveniences, in the present embodiment, as shown in FIG. 34, a length 1 of a portion of the feed path of the ink ribbon C, which extends from the contacting point of the print head 56 and the platen roller 57 to a central point of the stamp surface Ad of the stamp body A set in the pocket 6, is set to substantially half of the length of the plate-making sheet B. Specifically, the length L of the plate-making sheet B is equal to 128 mm and L/2 is equal to 64 mm, and accordingly the position of the stamp body A with respect to the print head 56 is set such that the above-mentioned length 1 of the portion of the feed path becomes equal to 66 mm including an empty feed of 2 mm.

Consequently, the ink ribbon C is further advanced by the empty feed of 2 mm after the plate-making sheet B is completely discharged from the apparatus, i.e. when the plate-making sheet B is released from the print head 56 and the platen roller 57, and then stopped . In the resulting stationary state, a central point in the longitudinal direction of the negative stamp images formed on the ink ribbon C coincides with the central point in the longitudinal direction of the stamp surface Ad (i.e. along the "width", specifically defined hereinafter) of the stamp body A. It should be noted that the empty feed of 2 mm is controlled based on detection of the backward end of the plate-making sheet B by the sensor 183.

According to the above construction, since the timing at which the plate-making sheet B is discharged or released from the apparatus substantially coincides with the timing at which the ink ribbon C reaches the exposure block, the exposure is prevented from being executed during the feeding of the ink ribbon C and the plate-making sheet B is prevented from being incompletely discharged from the apparatus. Further, the feed time of the ink ribbon C can be shortened, and wasteful use of the ink ribbon C is reduced. Moreover, as the above length 1 is set with reference to the central point in the longitudinal direction of the stamp surface Ad (along the width) of the stamp body A, it is possible to set a feed length (length 1) of the ink ribbon C to a fixed value regardless of the type of the plate making-sheet B (the stamp body A). Further, even if the manufacturing process causes variation in the length L of the plate-making sheet B, the plate-making sheet B can be reliably discharged or released from the apparatus.

Next, the exposure system 65 provided for the exposure block will be described with reference to FIGS. 13 and 14. The exposure system 65 includes an ultraviolet ray source 191 arranged in a manner opposed to the stamp surface Ad of the stamp body A set in the pocket 6, and the presser plate 58, arranged between the ultraviolet ray source 191 and the stamp surface Ad of the stamp body A. The stamp surface Ad of the stamp body A set in the pocket 6, the presser plate 58, and the ultraviolet ray source 191 are arranged such that they are spaced from each other by a gap in a manner parallel to each other. The ink ribbon C is positioned between the stamp surface Ad and the presser plate 58. The presser plate 58 is formed of a transparent resin or the like and is caused to move forward to displace the ink ribbon C so as to urge the same against the stamp surface Ad of the stamp body A. That is, when the exposure is carried out, the presser plate 58 urges the ink ribbon C against the stamp surface Ad of the stamp body A, and then the ultraviolet ray source 191 is lighted to expose the stamp surface Ad to ultraviolet rays using the ink ribbon C as a mask (see FIG. 13). In the present embodiment, an exposure time period during which the ultraviolet ray source 191 is energized is approximately 90 seconds.

Figure 16:
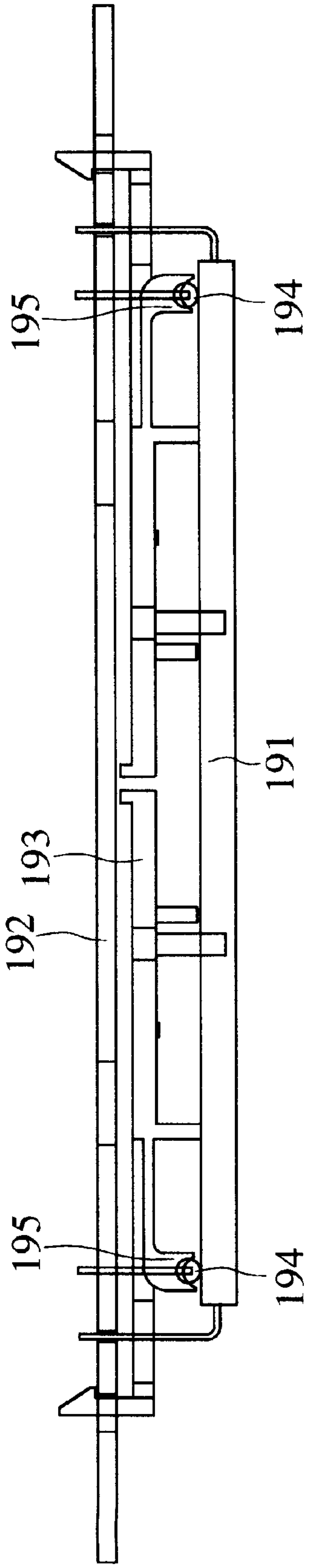
FIG. 16 is a plan view showing the ultraviolet ray source of the exposure system and component parts associated therewith.

The ultraviolet ray source 191 is a self-heating hot-cathode tube which is also called a semi-hot tube. As shown in FIG. 15A (front elevation), FIG. 15B (side elevation) and FIG. 16 (plan view), the ultraviolet ray source 191 is supported on a fluorescent tube holder 193 provided on a base plate 192. The ultraviolet ray source 191 has a pair of overtemperature cutouts 194, 194 arranged on longitudinal opposite ends thereof, for detecting expiration of the service life of the ultraviolet ray source 191 and failure of the same. Each overtemperature cutout 194 is constructed in the form of a hollow cylinder, and arranged such that it extends crosswise at right angles to the longitudinal axis of the ultraviolet ray source 191 and touches ultraviolet ray source 191 from underside thereof (i.e. from the holder side). Each overtemperature cutout 194 is held from underneath by a hold arm 194 extending from the fluorescent tube holder 193, and at the same time urged against the ultraviolet ray source 191 by the hold arm 195 having the resilient properties.

It is preferred that a reflector, not shown, is provided at the rear of the ultraviolet ray source 191 whereby the ultraviolet rays are caused to be emitted forward in a concentrated manner. Further, the overtemperature cutouts 194 may be provided in a manner spaced from the ultraviolet ray source 191 to thereby inhibit conduction of heat from the ultraviolet ray source 191 to the overtemperature cutouts 194. In this case, the rising of the amount of the ultraviolet rays emitted from the ultraviolet ray source 191 becomes better.

Figure 17:
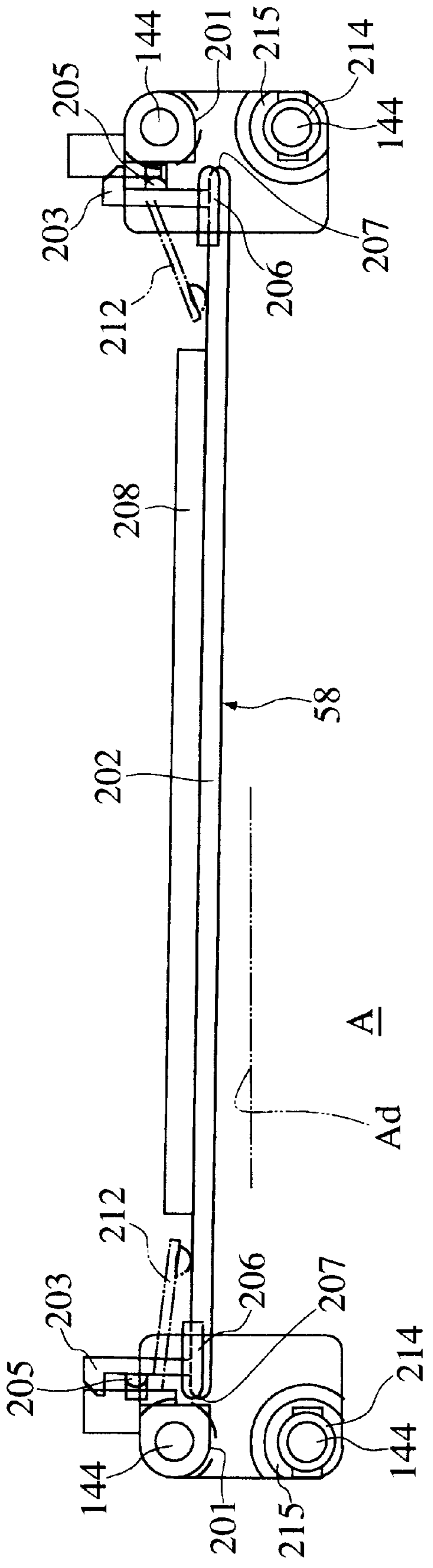
FIG. 17 is a plan view showing a presser plate of the exposure system and component parts associated therewith.
Figure 18:
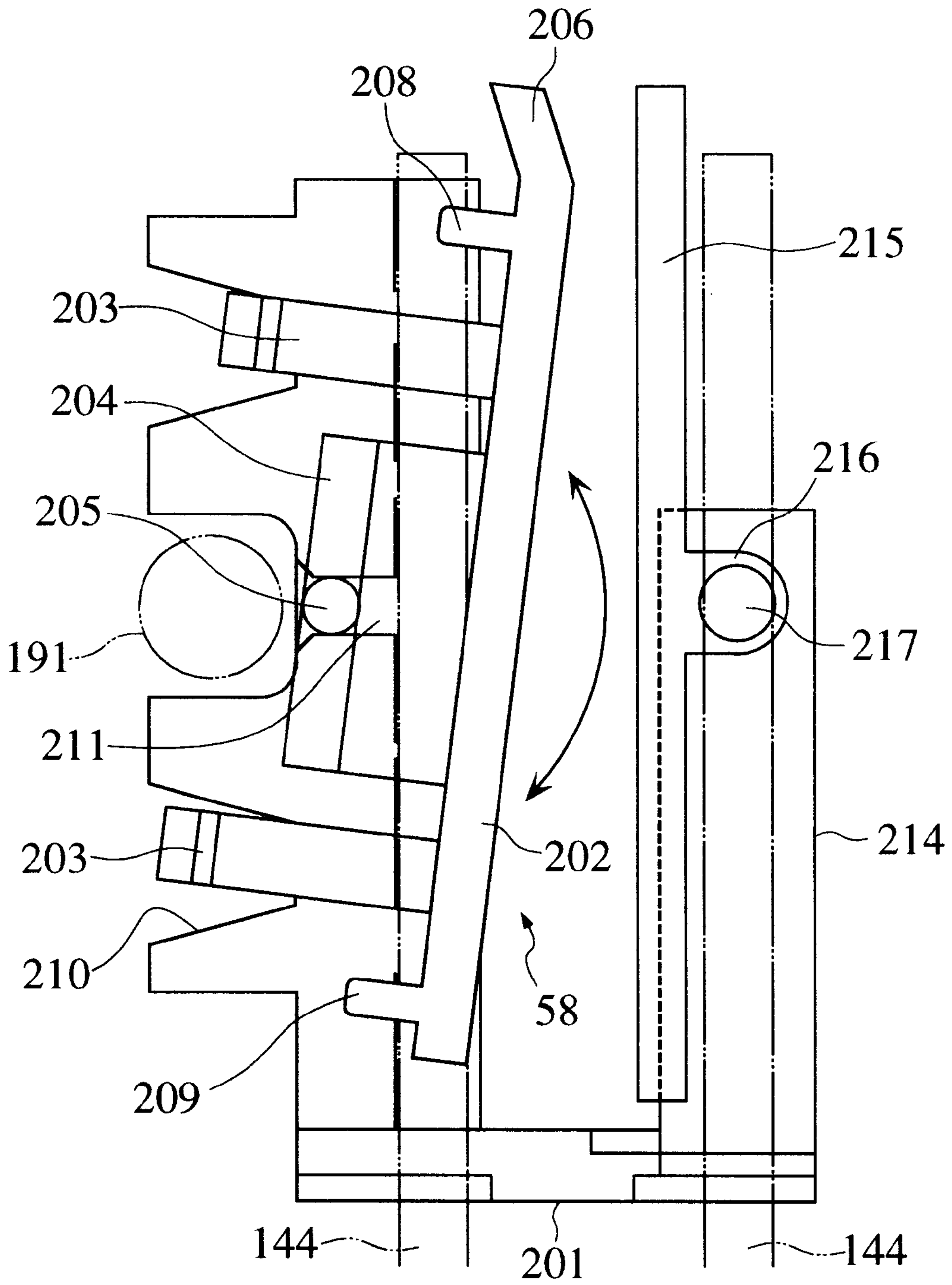
FIG. 18 is an enlarged side elevation showing the pressure plate and a presser plate holder of the exposure system.

The presser plate 58, as shown in FIGS. 17 and 18, is formed of a rectangular-shaped transparent resin or the like, and has longitudinal opposite ends thereof mounted on presser plate holders 201, 201. Each presser plate holder 201 is fitted on two support pins 144, 144 erected on each of the ends of the ribbon-holding link 62*c* (see FIG. 14). The presser plate 58 is comprised of a presser plate body 202, a pair of upper and lower guide nails 203, 203 extending backward from each of opposite ends of the presser plate body 202, and plates 204 each extending from the presser plate body 202 into space between the corresponding upper and lower guide nails 203, 203. Each plate 204 is formed with an outwardly projecting shaft portion 205 at a vertically intermediate location of the presser plate 58 for guiding the forward and backward swinging motion of the presser plate 58.

Although omitted in the figure, the presser plate body 202 is slightly bent in a direction away from the stamp body A, i.e. toward the ultraviolet ray source side along the longitudinal axis, whereby when the ink ribbon C is urged against the stamp surface Ad of the stamp body A by the presser plate 58, the ink ribbon C is outstretched or spread on the stamp surface Ad. Further, the presser plate body 202 is formed with guide pieces 206, 206 which extend upward from the top of the longitudinal opposite ends thereof in a manner obliquely bent backward. They guide the ink ribbon C into space between the presser plate 58 and the stamp body A properly when the ink ribbon cartridge 11 is mounted in the stamp-making apparatus. Further, each of the longitudinal opposite ends of the presser plate body 202 is chamfered to form a chamfered portion having a segmental cross-section. When the exposure is carried out, the ink ribbon C is bent along the chamfered portions so that no wrinkles are formed (see FIG. 13). In FIGS. 17 and 18, reference numerals 208, 209 designate ribs for increasing the rigidity of the presser plate body 202.

On the other hand, each presser plate holder 201 is formed with a pair of V-shaped grooves 210, 210 for guiding the pair of upper and lower guide nails 203, 203, transversely or forward and backward, and recesses 211 for respectively guiding the outwardly projecting shaft portions 205 such that they are rotatable about the longitudinal axis thereof. That is, the presser plate 58 is mounted on the presser plate holders 201, 201 at the longitudinal opposite ends thereof such that the guide nails 203 are respectively engaged with the V-shaped grooves 210, and the outwardly projecting shaft portions 205 are respectively engaged with the recesses 211 whereby the presser plate 58 is capable of moving forward and backward over a slight distance and swinging transversely. Further, in this state, a pair of spring pieces 212, 212 respectively extending from the presser plate holders 201 are urged against the outer or rear side of the opposite ends of the presser plate 58, whereby the presser plate 58 is urged toward the forward extremity position in which the nail portions of the guide nails 203 abut the bottoms of the V-shaped grooves 210, respectively.

Figure 13:
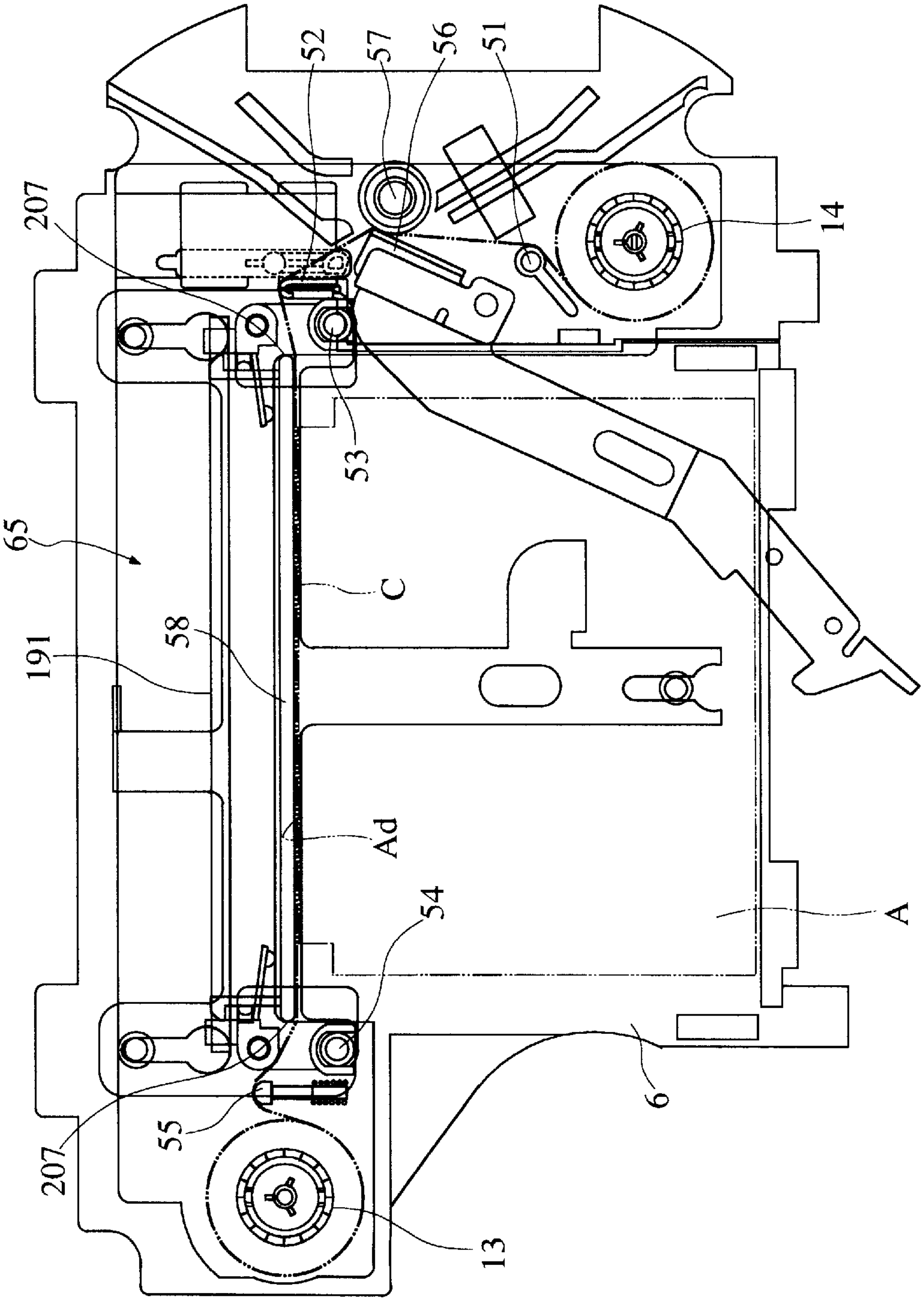
FIG. 13 is a plan view showing an exposure system of the mechanical block and component parts associated therewith.
Figure 14:
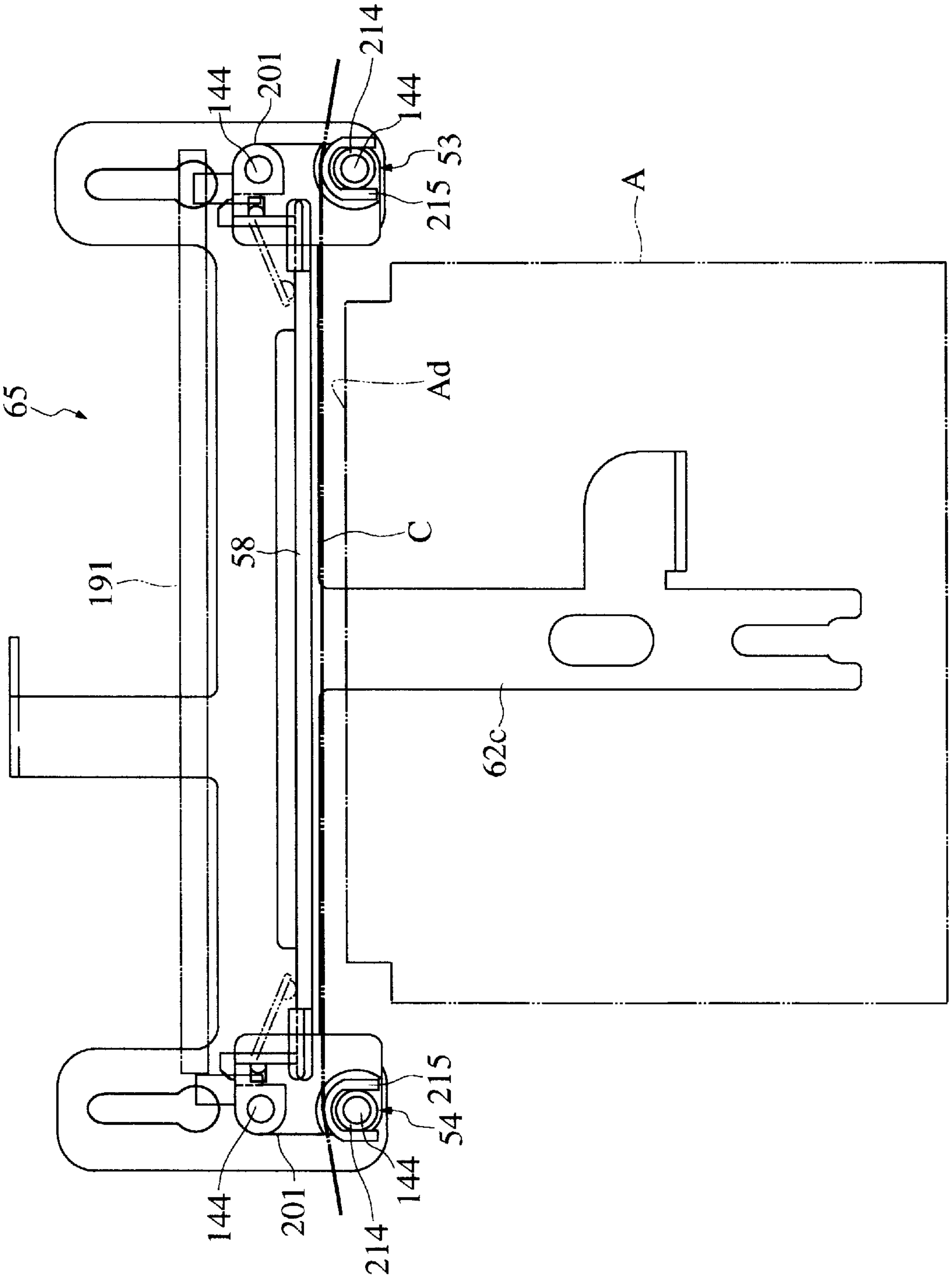
FIG. 14 is an enlarged plan view showing the exposure system of the mechanical block and component parts associated therewith.

As the ribbon-holding link 62*c* is moved forward from the state shown in FIG. 14 (or FIG. 2), the presser plate holders 201, 201 are moved forward, whereby the presser plate 58 makes a parallel translation toward the stamp surface Ad of the stamp body A. The stroke of movement of the ribbon-holding link 62*c* is slightly longer than the distance between the presser plate 58 and the stamp surface Ad of the stamp body A, and therefore, when the ribbon-holding link 62*c* reaches the forward extremity position, the presser plate 58 and the stamp surface Ad of the stamp body A strikes or abuts each other, so that the presser plate 58 receives a reactionary force from the stamp surface Ad to make a slight backward displacement with respect to the presser plate holders 201. Since the backward movement of the presser plate 58 is caused by the reactionary force from the stamp surface Ad, this reactionary force and the urging forces applied on the presser plate 58 become balanced to bring the presser plate 58 into contact along the stamp surface Ad of the stamp body A (see FIG. 13). That is, the presser plate 58 catches and brings the ink ribbon C into intimate contact with the stamp surface Ad of the stamp body A without forming any gap.

Further, as shown in FIG. 18, each presser plate holder 201 has a guide pin-holding portion 214 integrally formed therewith, and a corresponding one of the support pins 144 extends through the guide pin-holding portion 214. The guide pin-holding portions 214 have respective ribbon-sliding members 215 mounted thereon. Each ribbon-sliding member 215 is segmental in cross-section, with an arcuate surface thereof facing toward the presser plate side. The ribbon-sliding member 215 is formed with a pair of holding pieces 216 at a vertically intermediate portion thereof, each projecting to the front side and having a round through hole extending in a longitudinal direction. The round through holes of the holding pieces 216 of the ribbon-sliding members 215 are fitted in a pair of shaft projections 217 formed on the guide pin-holding portion 214, respectively, such that the holding pieces 216 are fitted on the guide pin-holding portion 214 from the outside, whereby the ribbon-sliding member 215 is mounted on the guide pin-holding portion 214 in a manner swingable about the axis of the shaft projections 217.

The guide pin-holding portions 214 and the ribbon-sliding members 215 are arranged outside an area of the presser plate 58 and the stamp body A (see FIGS. 14 and 17), and the guide pin-holding portion 214 and the ribbon-sliding member 215 located on the right-hand side as viewed in the figures form the first guide pin 53, and the guide pin-holding portion 214 and the ribbon-sliding member 215 located on the left-hand side form the second guide pin 54. That is, the first guide pin 53 and the second guide pin 54 guide the ink ribbon C through space between the presser plate 58 and the stamp surface Ad of the stamp body A such that the ink ribbon C is fed in parallel with the presser plate 58 and the stamp body A without interfering with any of them.

Although detailed description is made hereafter, since the guide pin-holding portions 214 form part of the presser plate holder 201, the first guide pin 53 and the second guide pin 54 are moved in the same direction as the presser plate 58 (driven by the ribbon-holding link 62*c*) is translated forward. This movement decreases the tension of the ink ribbon C stretched between the first and second guide pins 53, 54, whereby the ink ribbon C is urged against the stamp surface Ad of the stamp body A with reduced tension, i.e. without forming any vertical wrinkles thereon.

Now, the above-mentioned state of the ink ribbon C is described in further detail with reference to FIGS. 2 and 13. Referring to FIG. 2, when the ink ribbon C is fed or advanced, the pulling force of the take-up reel 13 causes strong tension of the ink ribbon C, so that vertical wrinkles are formed on the ink ribbon C due to its very small thickness. Therefore, if the ink ribbon C is urged against the stamp surface Ad of the stamp body A as it is, there remain the wrinkles formed on the ink ribbon C urged against the stamp surface Ad, so that deformed images (negative) of the stamp characters on the ink ribbon C are used in carrying out the exposure of the stamp surface Ad to the ultraviolet rays. On the other hand, if the ink ribbon C is loosened, the exposure can be carried out with the images of the stamp characters being out of position. To eliminate these inconveniences, as shown in FIG. 13, the first guide pin 53 and the second guide pin 54 are moved forward in accordance with the forward movement of the presser plate 58, whereby the tension of the ink ribbon C is reduced, and at the same time, a slight stretching force is applied to the ink ribbon C by the tension pin 55, which is moderate enough not to produce any wrinkles on the ink ribbon C.

Further, the ink ribbon C in the exposure position shown in FIG. 13 is bent backward at the longitudinal opposite ends of the presser plate 58 by the tension pin 55 and the second path-setting pin 52, and the chamfered portions formed at the longitudinal opposite ends of the presser plate 58 operate to prevent undesired wrinkles from being produced on the ink ribbon C.

Figure 19:
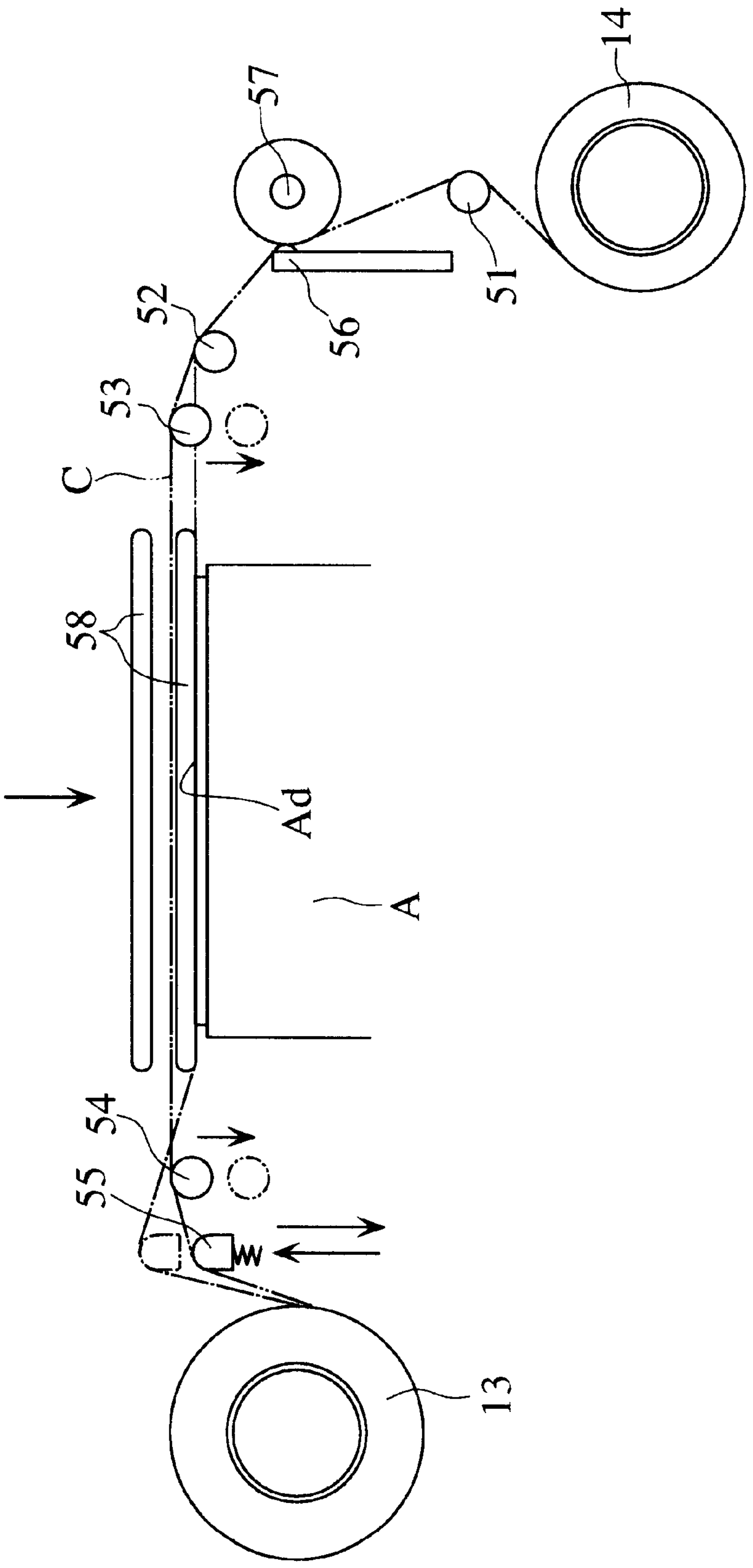
FIG. 19 is a diagram schematically showing a feed path of an ink ribbon.

Now, the feed path of the ink ribbon C will be described with reference to FIG. 19. The ink ribbon C rolled out from the supply reel 14 is properly guided by the first path-setting pin 51 to the printing device 64. From the printing device 64, the ink ribbon C is fed to the second path-setting pin 52, at which the ink ribbon C is largely bent. Then, it is properly guided by the first guide pin 53 and the second guide pin 54 to the exposure system 65 between them. Finally, the ink ribbon C is advanced via the tension pin 55, and taken up by the take-up reel 13. This feed path of the ink ribbon C is for feeding or advancing the ink ribbon C or for setting the same on standby for feeding. A feed path of the ink ribbon C during the exposure of the stamp body A to ultraviolet rays is different from the above feed path, as described hereinabove, and from a feed path of the same when the ribbon cartridge 11 is carried separately from the plate-making apparatus. Before describing the feed path of the ink ribbon C taken when the ribbon cartridge 11 is carried as an separate piece, the construction of the ribbon cartridge 11 per se including the reels and the pins will be described.

Figures 20A, 20B:
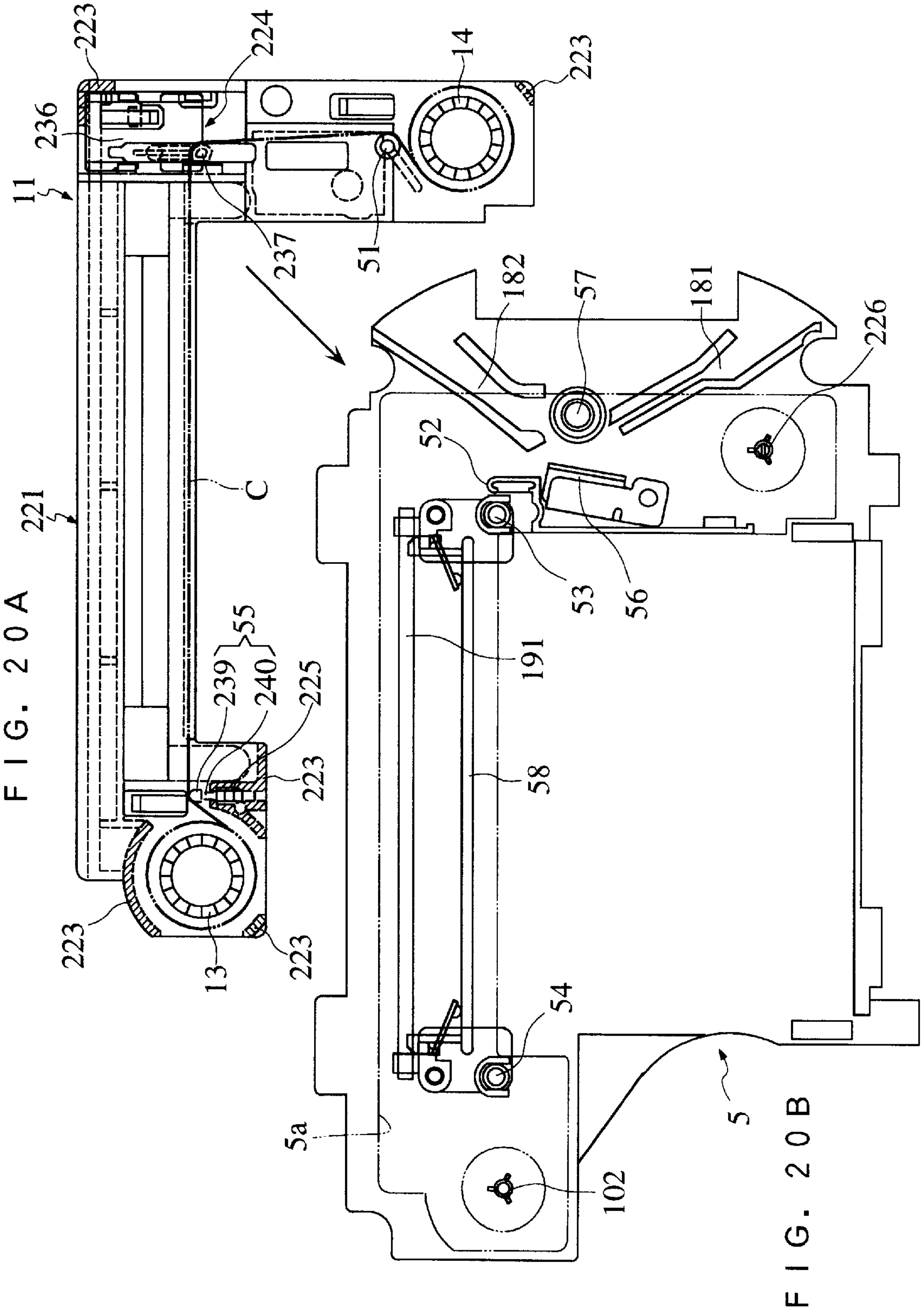
FIG. 20A is a plan view showing a ribbon cartridge.
FIG. 20B is a plan view showing a mechanical block body from which the FIG. 20A ribbon cartridge is removed.
Figure 21:
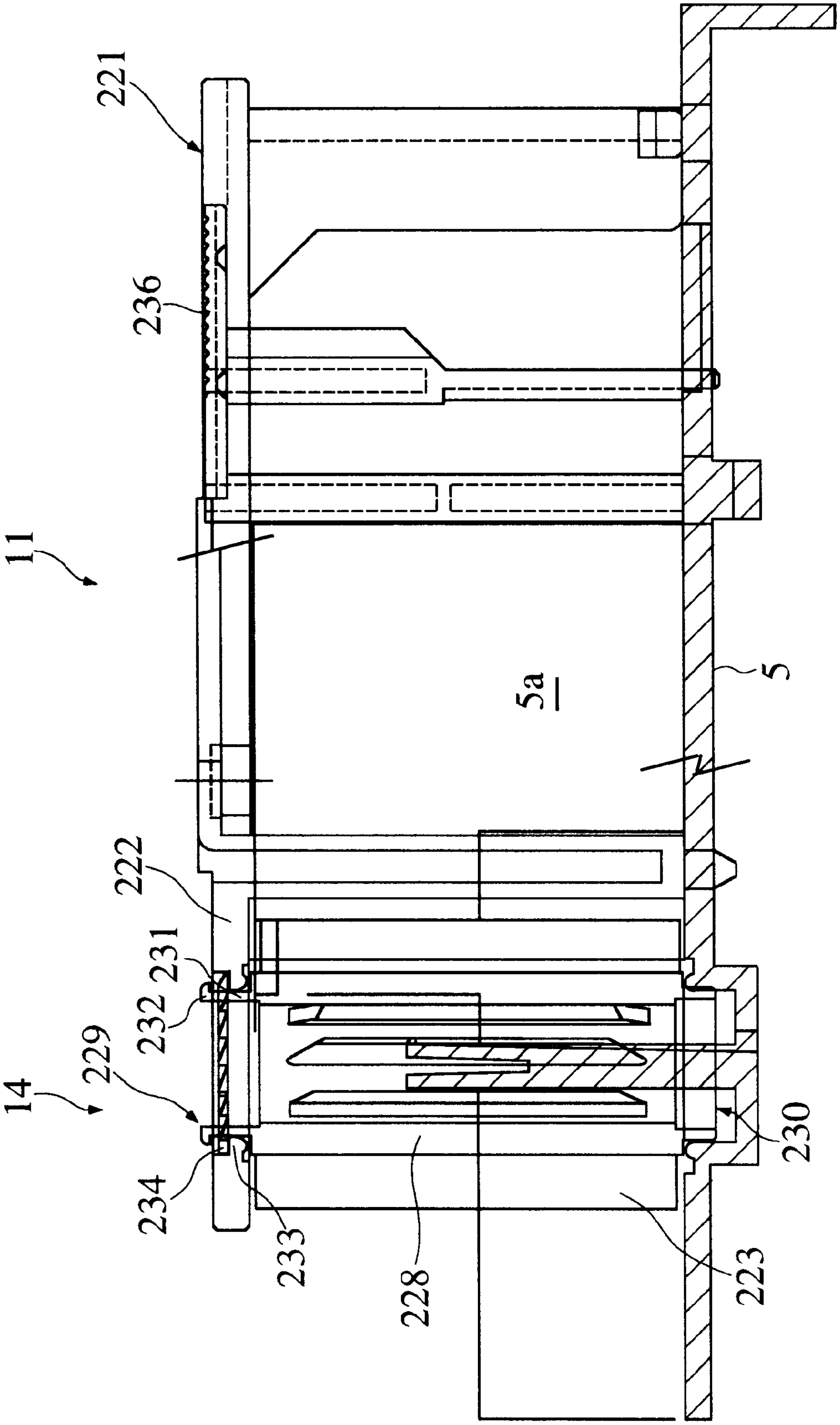
FIG. 21 is an enlarged side elevation showing the ribbon cartridge mounted in the mechanical block body.

As shown in FIGS. 20A and 21, the ribbon cartridge 11 includes a cartridge case 221 comprised of a base plate 222 in the form of an inverted L-shape, and a plurality of legs 223 extending from the base plate 222, as well as the reels and pins each attached to the cartridge case 221 in a cantilever manner. The ribbon cartridge 11 is mounted in the mechanical block body 5 by fitting the legs 223 in a receiving block 5*a* with the base plate 222 being positioned above. The legs 223 are arranged at corners of the inverted L-shaped cartridge case 221, as shown in FIGS. 20A.

At an end of a shorter-side portion of the base plate 222, the supply reel 14 extends downward in a rotatable manner, and at an end of a longer-side of the base plate 222, the take-up reel 13 extends downward in a rotatable manner. Further, at a location downstream of the supply reel 14 along the feed path of the ink ribbon C, the first path-setting pin 51 reinforced with ribs extends downward from the base plate 222, and at a location downstream of the first path-setting pin 51, there is provided a path-changing member 224 constructed in a manner movable forward and backward. At a location upstream of the take-up reel 13, the tension pin 55 is provided in a manner urged by a coiled spring 225 such that it can be moved forward and backward on the base plate 222. As shown in FIG. 20B, arranged in the receiving block 5a of the mechanical block body 5 are the reel shaft 102 of the take-up reel 13, a reel shaft 226 of the supply reel 14, the print head 56, the platen roller 57, the feeding passage 181 and the delivery passage 182, the second path-setting pin 52, the first and second guide pins 53, 54, the presser plate 58, the ultraviolet ray source 191, etc.

As shown in FIG. 21, the supply reel 14 (identical with the take-up reel 13) has a shaft 228 in the form of a hollow cylinder around which the ink ribbon C is wound, an upper engaging portion 229 extending from an upper end of the shaft 228, and a lower engaging portion 230 extending from a lower end of the shaft 228, whereby the supply reel 14 is rotatably held on the base plate 222 by the upper engaging portion 229, and on the mechanical block body 5 by the lower engaging portion 230. The upper engaging portion 229 is comprised of a hollow cylindrical portion 231, and an flanged end portion 232 continuously extending from an upper end of the hollow cylindrical portion 231. In a manner corresponding to this construction of the upper engaging portion 229, the base plate 222 is formed with a shaft-holding portion 233 for sliding contact with the hollow cylindrical portion 231 such that the hollow cylindrical portion 231 can rotate in the shaft-holding portion 233, and a stepped portion 234 on which the bottom of the flange of the flanged end portion 232 is seated. The bottom of the flanged end portion 232 and the stepped portion 234 are each in the form of sawteeth, and the supply reel 14 is rotatable only in one direction when the flanged end portion 232 is brought into contact (engaged) with the stepped portion 234.

In this case, when the ribbon cartridge 11 is mounted in the mechanical block body 5, the supply reel 14 is slightly pushed upward, whereby the flanged end portion 232 is disengaged from the stepped portion 234 to permit free rotation of the supply reel 14. On the other hand, when the ribbon cartridge 11 is not mounted in the mechanical block body 5, the supply reel 14 is displaced downward by empty load to cause the flanged end portion 232 to engage with the stepped portion 234, to set or form a rotation-inhibiting stop. The rotation-inhibiting stop is provided for preventing the ink ribbon C from becoming loose. In the case of the take-up reel 13, the rotation-inhibiting stop inhibits the ink ribbon from moving in a direction opposite to a feeding direction, and in the case of the supply reel 14, the rotation-inhibiting stop therefor inhibits the ink ribbon from moving in the feeding direction. It goes without saying that both the take-up reel 13 and the supply reel 14 are permitted to be rotated in respective directions in which the ink ribbon becomes tight. For a ribbon cartridge 11 provided for replacement, the base plate 222 is provided with a plate, not shown, on the top thereof for urging the flanged end portion 232 against the stepped portion 234, and the ribbon cartridge 11 is wrapped and provided in this state, i.e. with the flanged end portion 232 being urged on the stepped portion 234.

Figure 22:
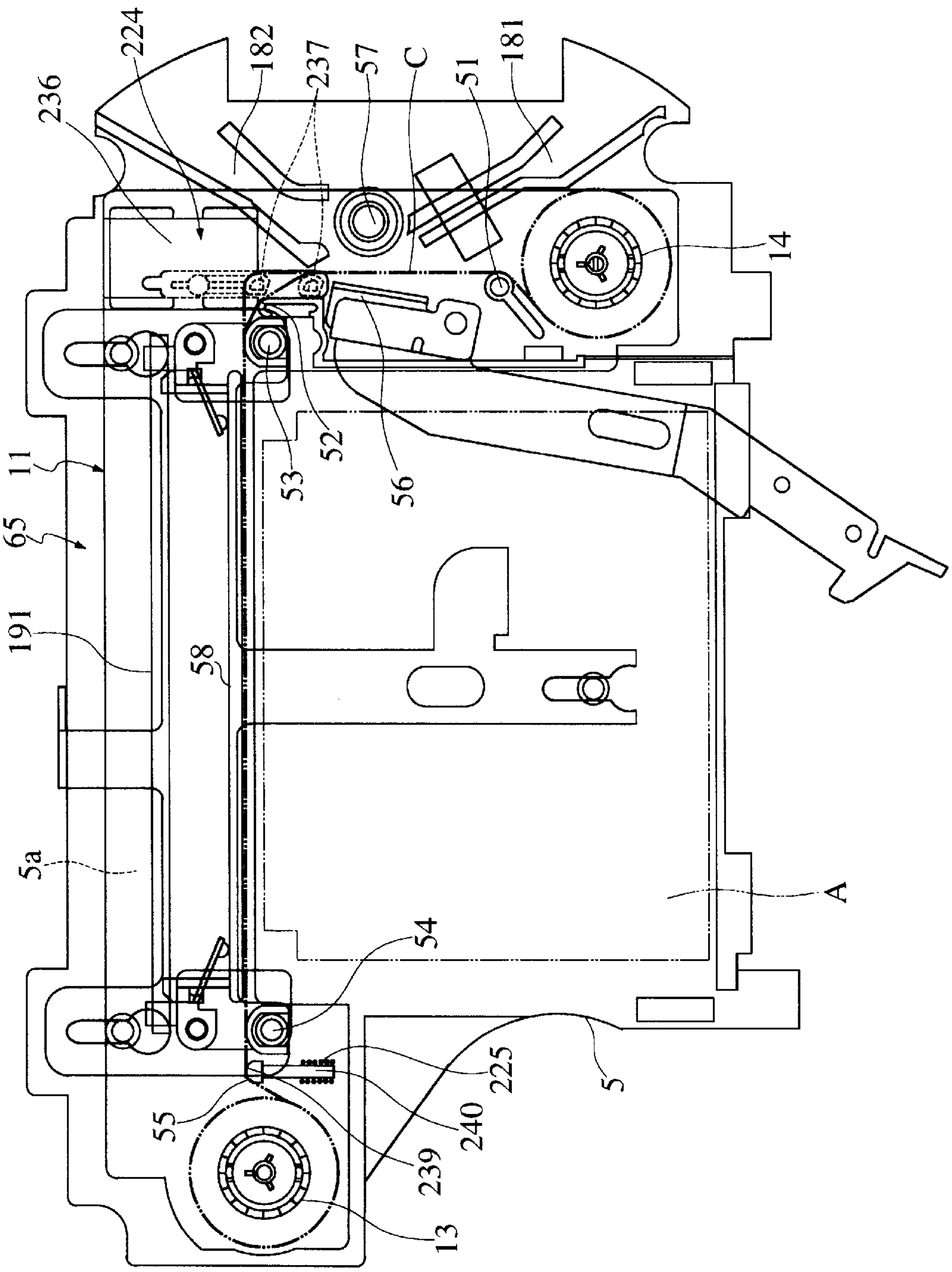
FIG. 22 is a plan view showing the mechanical block exclusive of the function switch, in which the ribbon cartridge has just been mounted.

As shown in FIGS. 20A and 21, the path-changing member 224 is comprised of a slider 236 slidably arranged at the corner of the base plate 222, and a path-changing pin 237 integrally formed with the slider 236. The slider is arranged such that the top thereof is exposed to the outside and at the same time flush with the top of the base plate 222. The path-changing pin 237 is moved transversely as the slider 236 slides, and stretches the ink ribbon between the take-up reel 13 and the supply reel 14 in a manner bent at right angles, when in the backward extremity position thereof. Before the ink ribbon cartridge 11 is mounted on the mechanical block body 5, the ink ribbon C is held in a state stretched to be bent at right angles, and after the ribbon cartridge 11 is mounted on the mechanical block body 5, the path-changing pin 237 is moved forward to the forward extremity position (see FIG. 22).

By the above arrangement, when the ribbon cartridge 11 is mounted, the path-changing pin 237 and the tension pin 55 cooperate to control the path of the ink ribbon C such that the ink ribbon C does not interfere with the presser plate 58, the stamp body A, the second path-setting pin 52, etc., and the path-changing pin 237 and the first path-setting pin 51 cooperate to control the path of the ink ribbon C such that the ink ribbon C does not interfere with the print head 56, the platen roller 57, etc. Then, after the ribbon cartridge 11 is mounted, the path-changing pin 237 is moved to thereby set the path of the ink ribbon C in position for feeding or for being on standby for feeding.

The tension pin 55 is comprised of a sliding contact portion 239 having a semicircular cross-section, and a support plate 240 supporting the sliding contact portion 239, and a coiled spring 225 arranged between the tension pin 55 and the base plate 222 urges the tension pin 55 in a direction for stretching the ink ribbon C. The urging force of the coiled spring 225 is moderate enough not to produce any wrinkles on the stretched ink ribbon C, and the tension pin 55 functions so as not to make the ink ribbon loose. That is, in a ribbon cartridge 11 for replacement, the take-up reel 13 and the supply reel 14 are in the rotation-inhibited state as described above, and the ink ribbon C is stretched between the take-up reel 13 and the supply reel 14. The tension pin 55 abutting the ink ribbon C prevents the ink ribbon C from becoming loose due to vibrations and the like.

Further, as described hereinbefore, when the presser plate 58 and the first and second guide pins 53, 54 are simultaneously moved forward toward the stamp body A to carry out the exposure, the tension pin 55 stretches the ink ribbon C to such a degree as will neither make the ink ribbon C loose nor produce any wrinkles on the ink ribbon C. If the tension pin 55 is not required to have the function described in the preceding paragraph, the tension pin 55 may be provided on the mechanical block body 5. This variation makes the tensioning function of the tension pin 55 more stable.

Figure 23A:
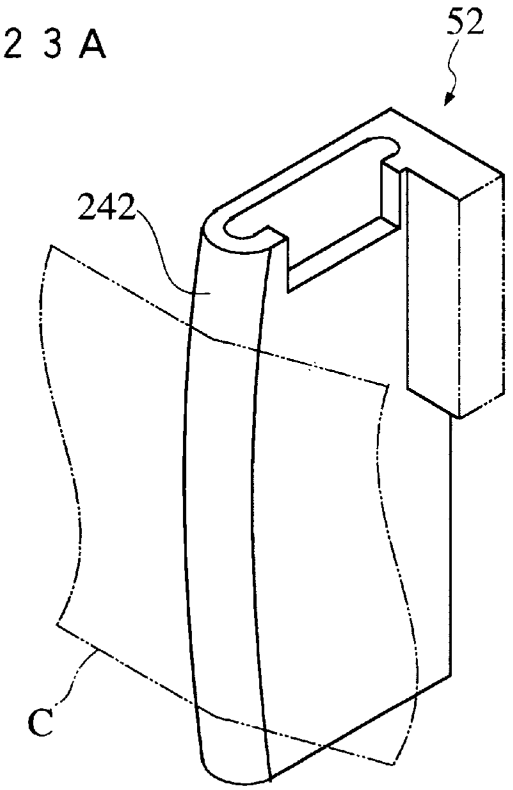
FIG. 23A is a partial perspective view showing a second path-setting pin.
Figure 23B:
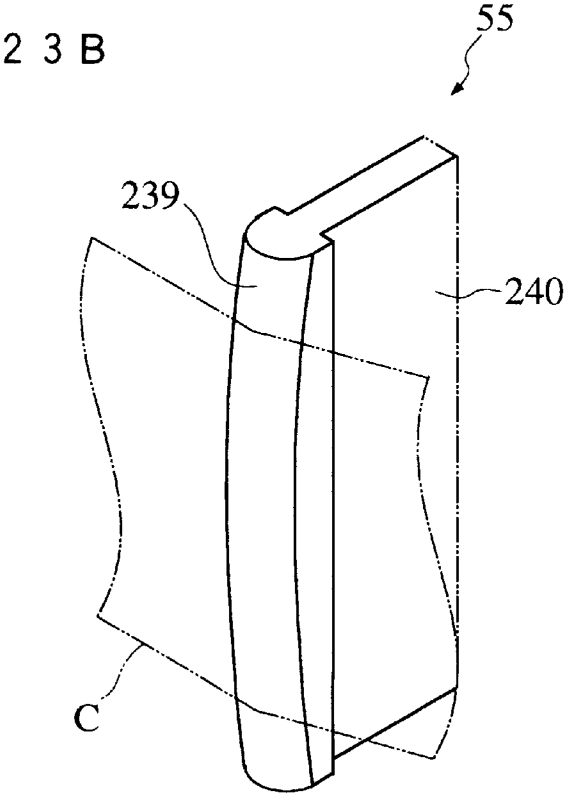
FIG. 23B is a partial perspective view showing a tension pin.
Figure 24:
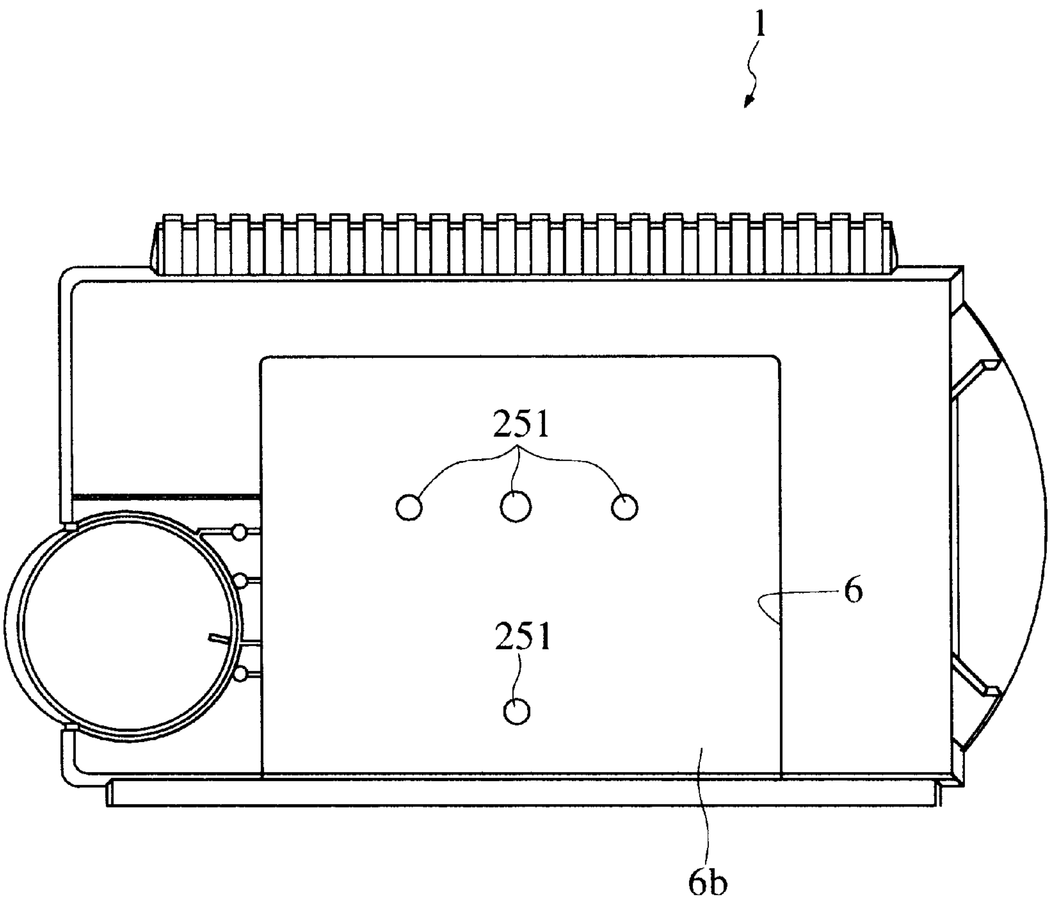
FIG. 24 is a plan view showing a pocket of the mechanical block from which a lid is removed and component parts associated with the pocket.

Further, as shown in FIGS. 23A and 23B, the sliding contact portion 242 of the second path-setting pin 52 and sliding contact portion 239 of the tension pin 55 are each formed such that it has a convex shape, similarly to a usual pulley, whereby the ink ribbon C is prevented from falling off the sliding contact portions 239, 242 when the ink ribbon C is fed in a state in which the width thereof extends vertically. This construction of the sliding contact portions 239, 242 also prevents the ink ribbon C from being fed in a state displaced laterally, i.e. in a state shifted to an upper or lower side of the feed path even if the ink ribbon C is not fed exactly perpendicularly to the sliding contact portions 239 and 242. That is, the ink ribbon C in sliding contact with the sliding contact portions 239 and 242 is fed along the path in a state such that the center of the width of the ink ribbon C expands slightly. The sliding contact portions 242, 239 of the second path-setting pin 52 and the tension pin 55, and the swingable ribbon-sliding members 215 of the first and second guide pins 53, 54 cooperate to hold the ink ribbon C at a fixed position in a vertical direction to thereby cause the ink ribbon C to face the exposure system 65 in parallel therewith.

Next, the detecting device 66, the operation of which is linked to the opening and closing of the lid 7, will be described. The detecting device 66 detects the mounting of the stamp body A in the pocket 6, and at the same time discriminates the type of the mounted stamp body A. The stamp body A includes various types having respective different shapes, e.g. ones for a square stamp, a personal name stamp, a business stamp, an address stamp, etc. The stamp bodies A for these different types of the stamp are identical in length, but different in width and thickness. It should be noted that the above "length" means a size of the stamp body A between the stamp surface Ad and the surface on an opposite side thereof, the above "width" means a size of the stamp body A between the surfaces of opposite lateral ends thereof in its position mounted in the pocket 6, and the above "thickness" means a size of the stamp body between an upper side surface and a lower side surface of the stamp body in its position mounted in the pocket 6. To set each of these various types of the stamp body A different in width and thickness to a fixed position with respect to the directions along the width and the thickness of the stamp body A, in the present embodiment, as shown in FIGS. 24 and 25A to 25D, four bosses 251, 251, 251, 251, long and short, are provided on the bottom 6*b* of the pocket 6 such that they extend perpendicularly upward from the bottom, and the stamp body A is formed with fitting holes Af for fitting corresponding ones of the bosses therein, respectively.

Figure 25A:
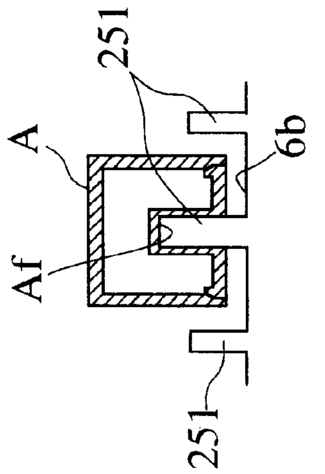
Figure 25B:
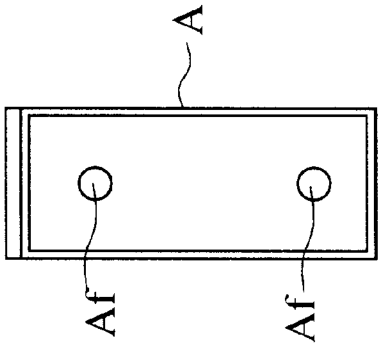
Figure 25C:
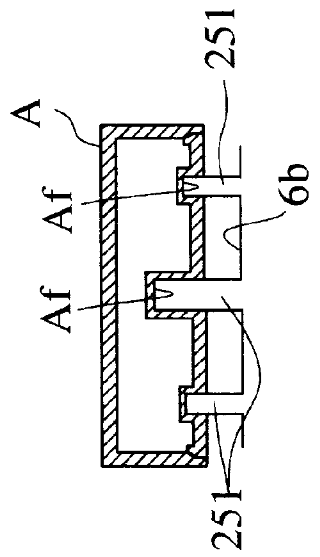
Figure 25D:
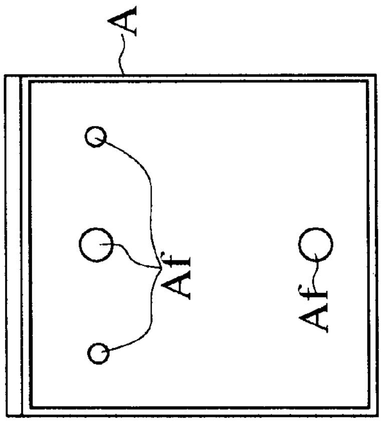

The four bosses 251, 251, 251, 251 are arranged to form a T shape, and in a manner corresponding thereto, a stamp body A for a square stamp, for example, is formed with two fitting holes Af, Af (see FIGS. 25A and 25B), and a stamp body A for a business stamp, for example, is formed with four fitting holes Af, Af, Af, Af (see FIGS. 25C and 25D) . The number of the fitting holes Af and the depth of each of them depend on the type of the stamp body A, whereby each stamp body A is mounted in the pocket 6 such that the center of the stamp surface Ad of the stamp body A mounted in the pocket 6 is positioned to a fixed location.

Further, the back surface Ag, i.e. the surface on the side opposite to the stamp surface Ad is formed with a plurality of small holes Ah (type-detecting holes) at respective central locations i.e. at intermediate locations along the thickness of the stamp body A, in a horizontally symmetrical manner. The small holes Ah cooperate with a switch array 262 of the detecting device 66, described hereinafter, to detect the type of the stamp body A (see FIGS. 31A~31G). The stamp character label Bd of the plate-making sheet B printed with stamp characters and delivered to the outside of the apparatus separately from the ink ribbon C is affixed to the back surface Ag of the stamp body A, whereby the small holes Ah are concealed.

Figure 26:
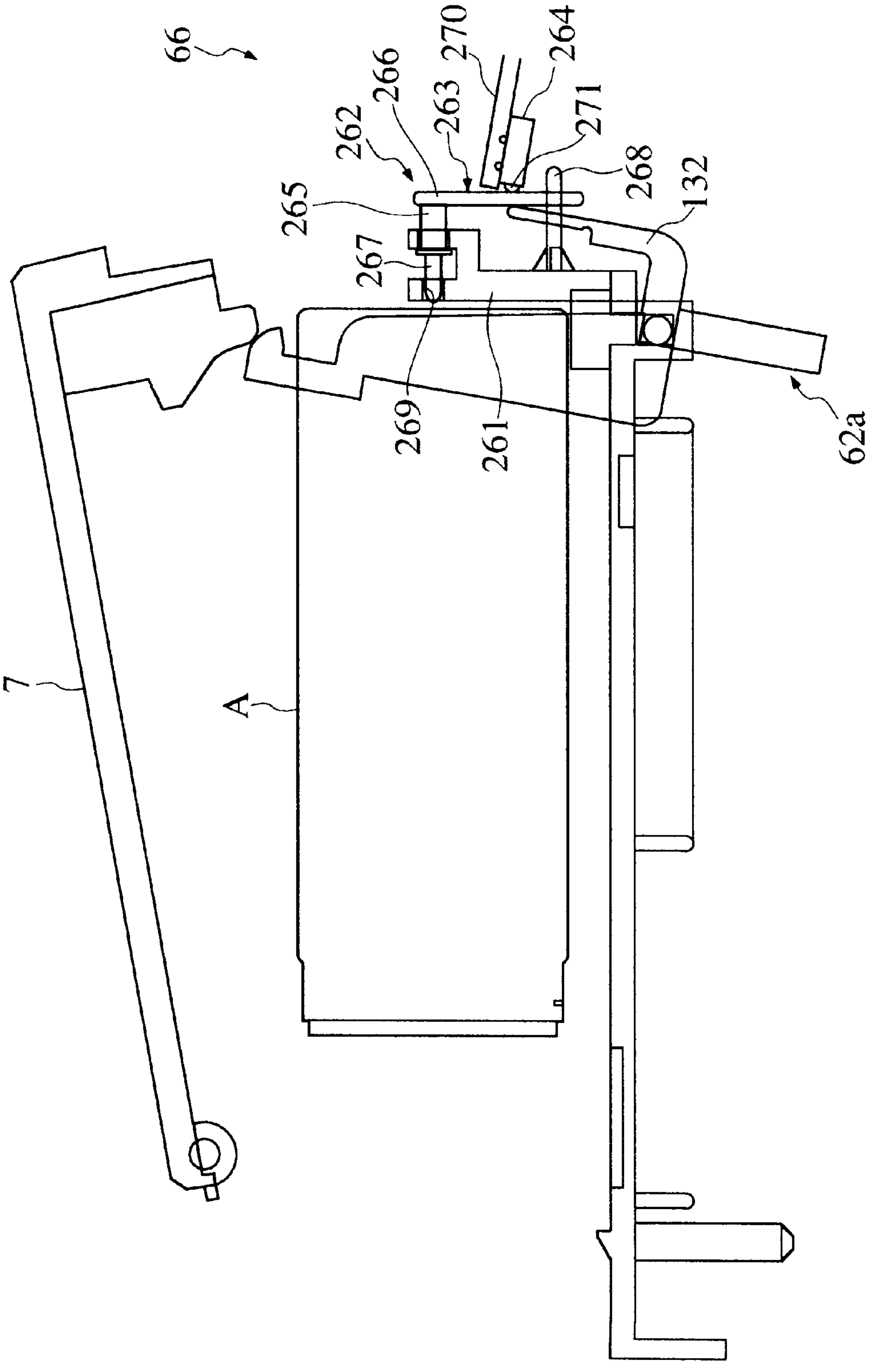
FIG. 26 is a cross-sectional view showing the pocket as well as a detecting device and component parts associated therewith.
Figure 27:
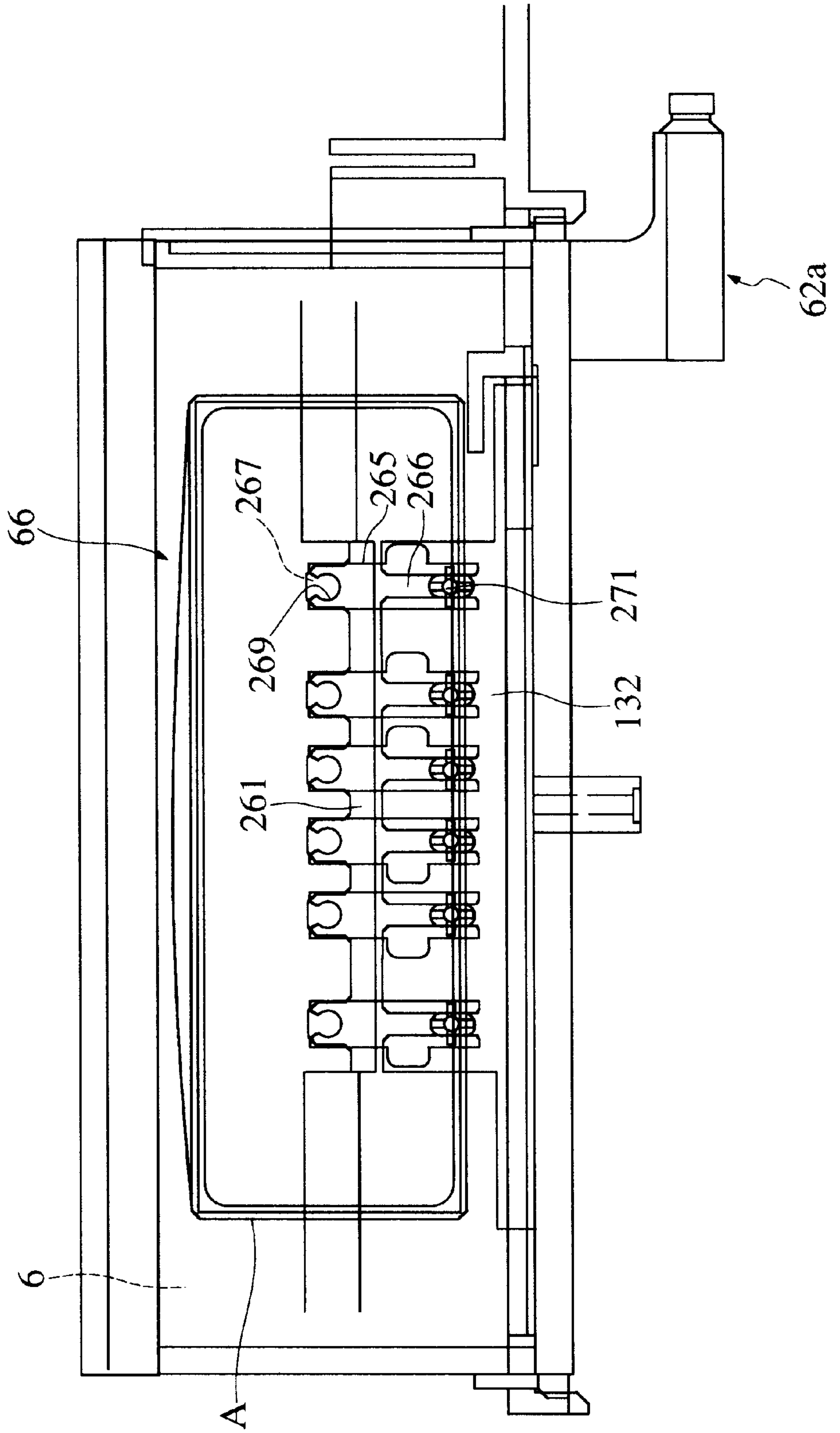
FIG. 27 is a front elevation showing the pocket as well as the detecting device and the component parts associated therewith.
Figure 28:
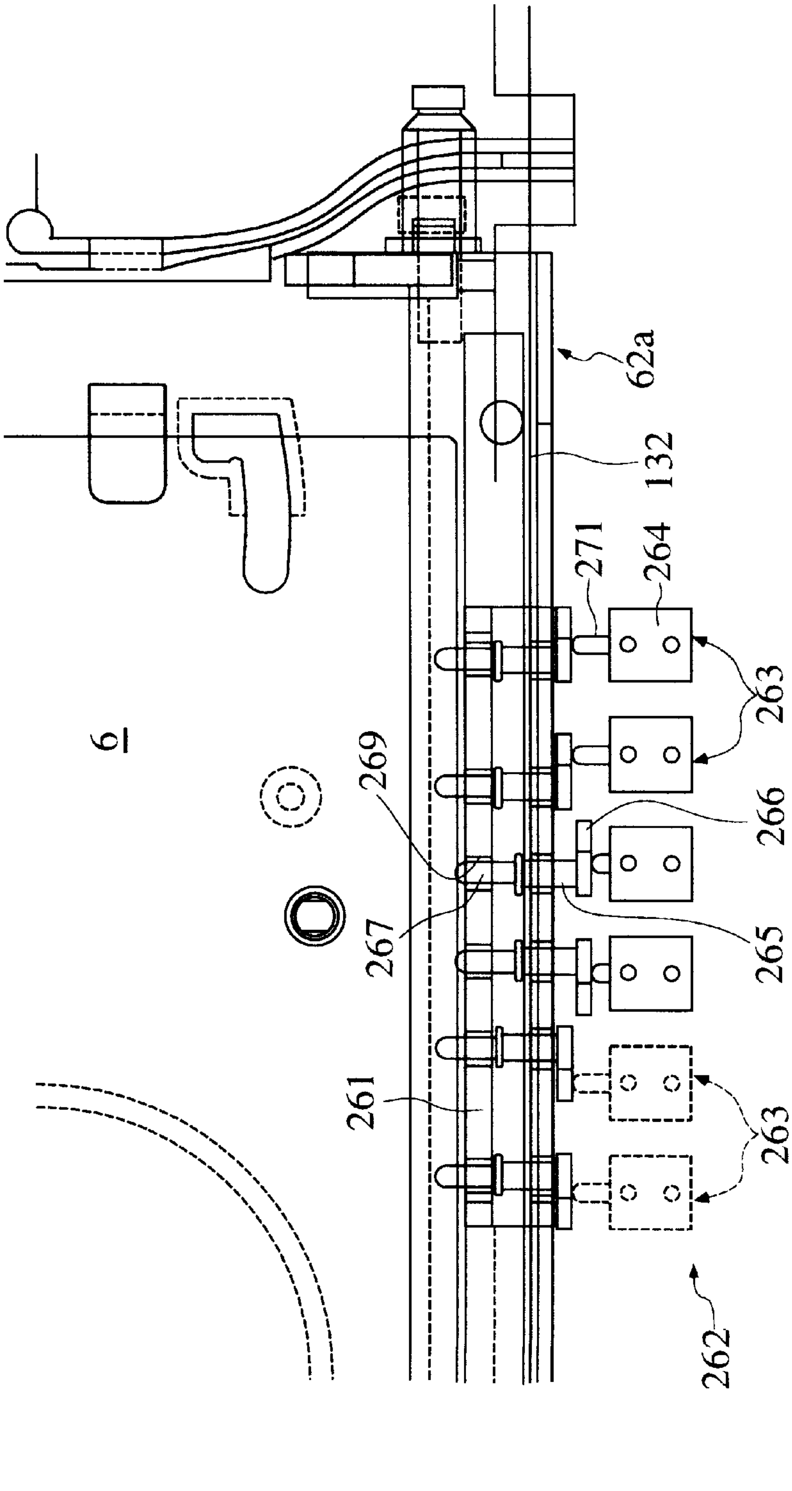
FIG. 28 is a partial plan view showing part of the pocket as well as the detecting device and the component parts associated therewith.

The detecting device 66, as shown in FIGS. 26 to 28, includes switch holders 261 (also serving as the walls of the pocket 6) arranged opposed to the back surface Ag of the stamp body A, and the switch array 262 formed of six detecting switches 263 supported on the switch holders. Each detecting switch 263 is comprised of a switch body 262 formed e.g. of a push switch, and a switch top 265 having one end for being projected into the pocket 6. The switch top 265 is formed by a plate portion 266 and a detecting projection including the one end 267 extending at right angles to the plate portion 266, with a lower part of the plate portion 266 being guided by a guide projection 268 formed in the switch holder 261 and the detecting projection 267 being guided by a guide hole 269 formed in the switch holder 261 for forward and backward motions thereof.

The switch body 264 is fixed to the reverse side surface of a base plate 270 such that a plunger 271 thereof abuts the plate portion 266 of the switch top 265. The plunger 271 urges the switch top 265 toward the pocket 6 by its urging force. A state of the one end of the detecting projection 267 projected into the pocket 6 via the guide hole 269 through the switch holder 261, and a state of the same being retracted against the urging force of the plunger 271 correspond to ON-OFF states of the detecting switch 263, respectively.

On the other hand, a switch-operating portion 132 of the lid-opening link 62*a* is caused to abut the plate portion 266 of the switch holder 261, thereby urging the plate portion 266 against the urging force of the plunger 271. With rotation of the lid-opening link 62*a*, all the switch tops 265 are moved forward or backward. The switch-operating portion 132 and the switch top 265 may be formed as a unitary member. Alternatively, the switch top 265 and the detecting switch 263 may be formed as a unitary member, and the switch-operating block 132 may move the base plate 270.

When the lid-opening link 62*a* rotates in a clockwise direction as viewed in FIG. 26 to hold the lid 7 open, the switch top 265 moves forward (toward the base plate 270 side) so that the detecting projection 267 is retracted from within the pocket 6. This cancels the detecting mode of the detecting device 66, and the stamp body A can be mounted or removed without interference to the detecting projection 267. On the other hand, when the lid-opening link 62*a* is rotated in an anticlockwise direction to hold the lid 7 closed, the switch top 265 moves backward (to the pocket 6 side) so that the detecting projection 267 projects into the pocket 6. This sets the detecting mode of the detecting device 66. In this mode of the detecting device, if the stamp body A is mounted in the pocket 6, the switch top 265 is brought into contact with the stamp body A to turn off the detecting switch 263 whereby the mounting of the stamp body A is detected (see FIG. 29). Inversely, if the stamp body A is not mounted, the switch top 265 projects to the maximum extent to turn on the detecting switch 263, whereby the removal of the stamp body A is detected.

Actually, when any of the detecting switches 263 of the switch array 262 is turned off, mounting of the stamp body A is detected, whereas when all of the detecting switches 263 are turned on, removal of the stamp body A is detected. Alternatively, instead of setting or canceling the detecting mode of the detecting device 66, opening of the lid 7 may be detected by detecting the retraction of the detecting projections 267 of the switch top 265 shown in FIG. 26 from within the pocket 6, or a priority detection signal for inhibiting the exposure may be generated by the detection of the retraction of the detecting projections 267.

Figure 29:
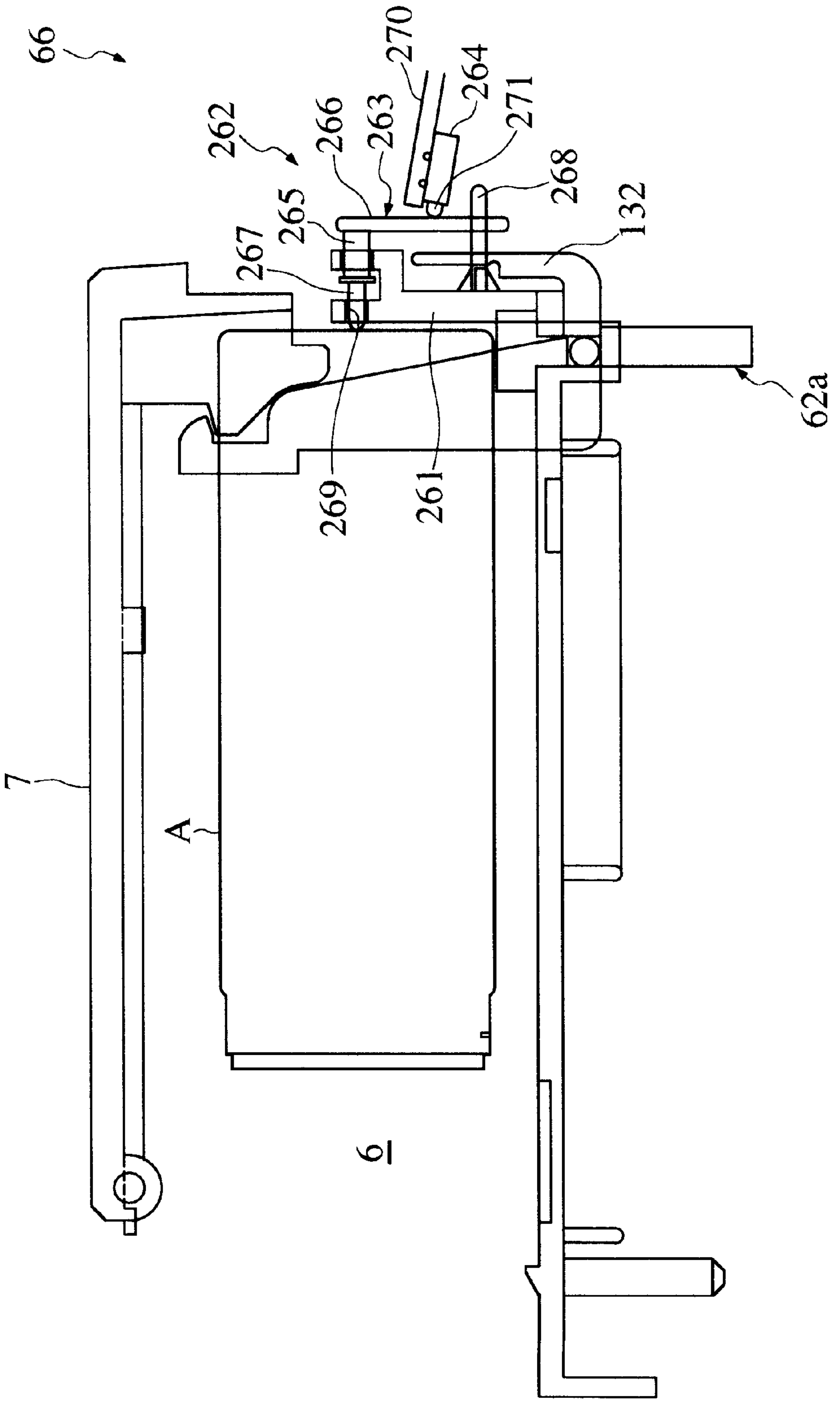
FIG. 29 is a cross-sectional view which is useful in explaining one of two states of detecting operation of the detecting device.
Figure 30:
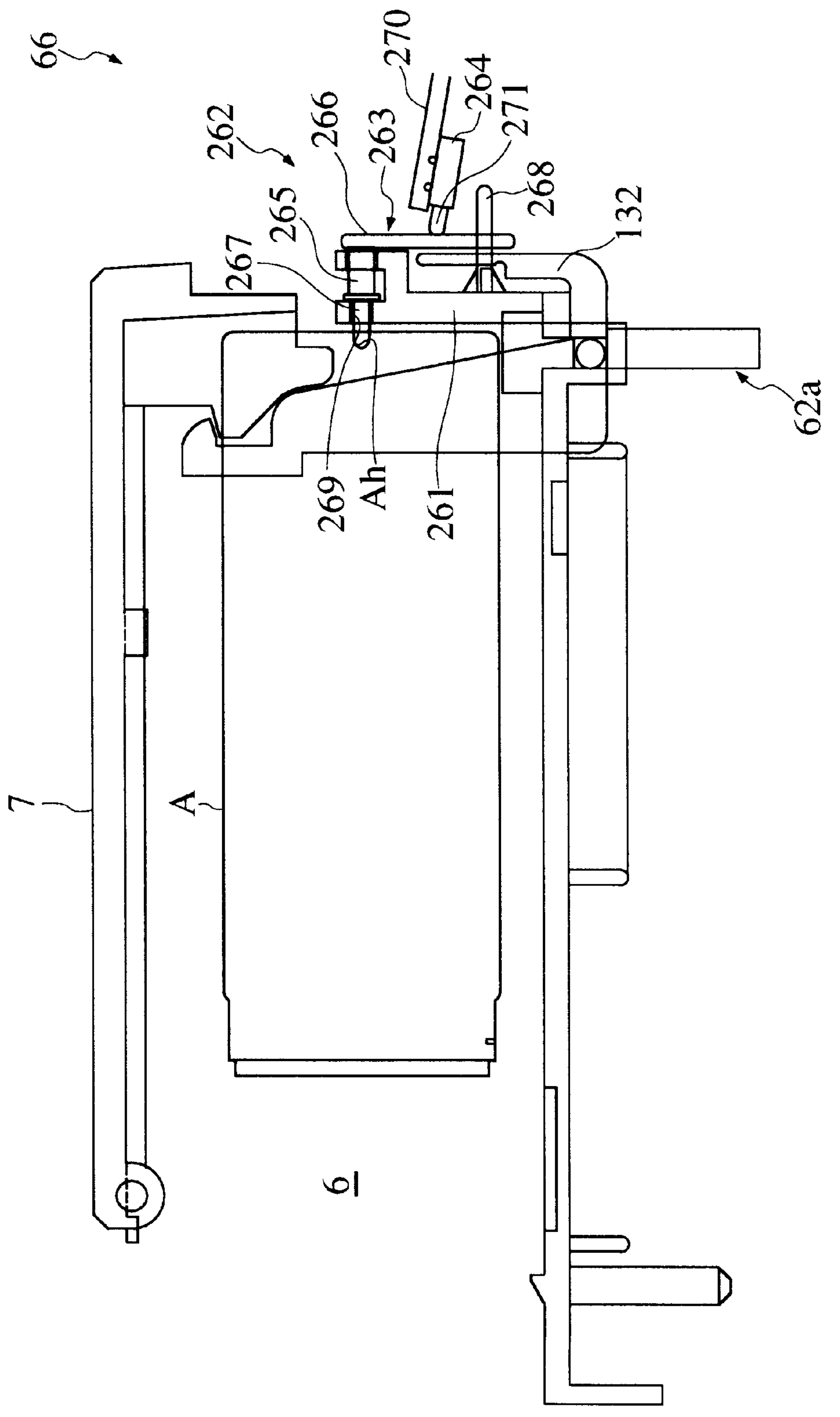
FIG. 30 is a cross-sectional view which is useful in explaining the other of two states of detecting operation of the detecting device.

Further, the detecting switches 263 of the switch array 262 are each in ON or OFF state depending on whether a corresponding small hole Ah exists in the stamp body A, as shown in FIG. 29 or 30. Therefore, the type of the stamp body A can be determined from a pattern of ON/OFF states of the six detecting switches 263.

FIGS. 31A to 31G show the relationship between small holes Ah in the stamp body A and the six detecting switches 263 (detecting projections 267). Provision of the six detecting switches 263 for detecting presence or absence of the small holes Ah makes it possible to detect $2^n-1$ (n=6), i.e. 63 types of patterns. A stamp body A for a square stamp or the like, which is small in width, has no small holes Ah corresponding to two outermost detecting switches 263, 263 on respective opposite sides, and the two detecting switches 263, 263 project into space beside the stamp body A. That is, a stamp body having a small width, such as a stamp body for a square stamp, is recognized as a pattern for a stamp body having imaginary small holes Ah at outermost locations thereof.

In other words, out of the 63 types of patterns, ones having small holes Ah at outermost locations of the stamp body A are assigned to stamp bodies A for the square stamps and the like which have small widths, whereby stamp bodies which do not have a sufficient width for possible small holes Ah corresponding to all the detecting switches 263 can be discriminated, without decreasing the number of possible patterns of small holes. The six detecting switches 263 include spare switches, and in practice, four detecting switches 263 are sufficient.

It is further understood by those skilled in the art that the foregoing is preferred embodiments of the invention, and that various changes and modifications may be made without departing from the sprit and scope thereof.

What is claimed is:

1. In a plate-making strip having two long sides and two short sides and a center, the short sides extending between, and being shorter than, the long sides, said plate-making strip including a base sheet and an adhesive sheet laminated on said base sheet, the improvement wherein said adhesive sheet has a single label portion for being printed with an image, said single label portion being spaced generally equidistant from the two long sides and generally equidistant from the two short sides, said single label portion being defined by a cutting line formed in said adhesive sheet, the cutting line defining an enclosed area, said strip having at least one through hole for being detected by a sensor, at a location spaced from a corresponding one of said two short sides by a predetermined distance, said at least one through hole being outside said label portion, wherein said at least one through hole consists of a single pair of holes, wherein each hole of said single pair of holes is offset from a center line parallel to, and equidistant from, said two long sides of said plate-making strip, wherein an axis passing through the center of said plate-making strip and forming an acute angle with said center line, passes through each hole of said pair of through holes, and wherein said center is equidistant from each hole of said pair of through holes.

2. A plate-making strip group, comprising a plurality of different types of plate-making strips having respective label portions different from each other, each of the plate-making strips having two long sides and two short sides and a center, the short sides extending between, and being shorter than, the long sides, said each of the plate-making strip including a base sheet and an adhesive sheet laminated on said base sheet, the improvement wherein said adhesive sheet has a single label portion for being printed with an image, said single label portion being spaced generally equidistant from the two long sides and generally equidistant from the two short sides, said single label portion being defined by a cutting line formed in said adhesive sheet, the cutting line defining an enclosed area, said strip having at least one through hole for being detected by a sensor, at a location spaced from a corresponding one of said two short sides by a predetermined distance, said at least one through hole being outside said label portion, wherein said at least one through hole consists of a single pair of holes, wherein each hole of said single pair of holes is offset from a center line parallel to, and equidistant from, said two long sides of said plate-making strip, wherein an axis passing through the center of said plate-making strip and forming an acute angle with said center line, passes through each hole of said pair of through holes, and wherein said center is equidistant from each hole of said pair of through holes, wherein said plurality of different types of said plate-making strips are distinguished from each other in respect of a color of at least one of said base sheet and said adhesive sheet.

3. A plate-making strip according to claim 1, wherein said base sheet and said adhesive sheet are of respectively different colors.

4. A plate-making strip group according to claim 2, wherein said base sheet and said adhesive sheet of each of said types of plate-making strips are of respectively different colors.

5. A plate-making strip according to claim 1, wherein the adhesive sheet has a printing surface, the base sheet has a non-printing surface, and the printing surface and the non-printing surface are of different colors.

6. A plate-making strip according to claim 5, wherein the non-printing surface of the base sheet is of achromatic color.

7. A plate-making strip according to claim 5, further comprising a plurality of the plate-making strips in which the label portion of each is defined by a cutting line formed in the printing sheet thereof, the label portions of the plurality of plate-making strips comprising a plurality of different sizes, and the colors of the printing surfaces of the plurality of plate-making strips are of different colors according to the sizes of the label portions thereof.

8. A plate-making strip according to claim 1, wherein the single label portion is spaced in a central portion on a printing surface of the adhesive sheet.

9. A plate-making strip according to claim 1, wherein the plate-making strip is formed with a to-be-detected portion for being detected by a sensor, the to-be-detected portion being offset from a center line parallel to the two longs sides.

* * * * *